(12) United States Patent
Rudnik

(10) Patent No.: US 11,308,204 B2
(45) Date of Patent: Apr. 19, 2022

(54) AGENTLESS SECURITY

(71) Applicant: McAfee, LLC, San Jose, CA (US)

(72) Inventor: Lior Rudnik, San Jose, CA (US)

(73) Assignee: McAfee, LLC, San Jose, CA (US)

( * ) Notice: Subject to any disclaimer, the term of this patent is extended or adjusted under 35 U.S.C. 154(b) by 125 days.

(21) Appl. No.: 16/549,115

(22) Filed: Aug. 23, 2019

(65) Prior Publication Data

US 2021/0056200 A1 Feb. 25, 2021

(51) Int. Cl.
  *G06F 21/00* (2013.01)
  *G06F 21/53* (2013.01)
  *G06F 21/56* (2013.01)
  *G06F 21/54* (2013.01)

(52) U.S. Cl.
  CPC .............. *G06F 21/53* (2013.01); *G06F 21/54* (2013.01); *G06F 21/562* (2013.01); *G06F 21/566* (2013.01)

(58) Field of Classification Search
  None
  See application file for complete search history.

(56) References Cited

U.S. PATENT DOCUMENTS

| | | | |
|---|---|---|---|
| 9,118,711 B2 * | 8/2015 | Oliphant | G06F 16/245 |
| 9,158,935 B2 * | 10/2015 | Livshits | G06F 8/75 |
| 9,910,655 B1 | 3/2018 | Ranganathan et al. | |
| 10,623,417 B1 * | 4/2020 | Hohler | G06F 9/547 |
| 2011/0099620 A1 * | 4/2011 | Stavrou | H04L 63/0884 726/12 |
| 2014/0007214 A1 * | 1/2014 | Qureshi | G06F 21/53 726/12 |
| 2014/0181896 A1 | 6/2014 | Yablokov et al. | |
| 2015/0193257 A1 * | 7/2015 | Sonnek | G06F 9/45558 718/1 |
| 2016/0378578 A1 | 12/2016 | Nandakumar | |
| 2018/0060584 A1 * | 3/2018 | Ahuwanya | G06F 21/577 |
| 2018/0181451 A1 * | 6/2018 | Saxena | G06K 9/6267 |
| 2019/0103359 A1 | 4/2019 | Malik et al. | |
| 2019/0138712 A1 | 5/2019 | Margiolas | |
| 2019/0180006 A1 | 6/2019 | Bojjireddy et al. | |

\* cited by examiner

*Primary Examiner* — Maung T Lwin

(74) *Attorney, Agent, or Firm* — Patent Capital Group

(57) ABSTRACT

There is disclosed in one example a computing apparatus, including: a hardware platform including a processor and a memory; a closed operating system including instructions within the memory to sandbox userspace applications; and a sandboxed userspace application, including: instructions to provide a user interface and user application code; and an agentless security library within the sandboxed userspace application, the agentless security library including instructions to provide security or privacy services to the sandboxed userspace application with minimal direct interaction from the user interface and user application code.

19 Claims, 13 Drawing Sheets

US 11,308,204 B2

AGENTLESS SECURITY

FIELD OF THE SPECIFICATION

This application relates in general to computer security, and more particularly, though not exclusively, to a system and method for providing agentless security.

BACKGROUND

Modern computing ecosystems often include "always on" broadband internet connections. These connections leave computing devices exposed to the internet, and the devices may be vulnerable to attack.

BRIEF DESCRIPTION OF THE DRAWINGS

The present disclosure is best understood from the following detailed description when read with the accompanying FIGURES. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion. Furthermore, the various block diagrams illustrated herein disclose only one illustrative arrangement of logical elements. Those elements may be rearranged in different configurations, and elements shown in one block may, in appropriate circumstances, be moved to a different block or configuration.

SUMMARY

Figure 1:
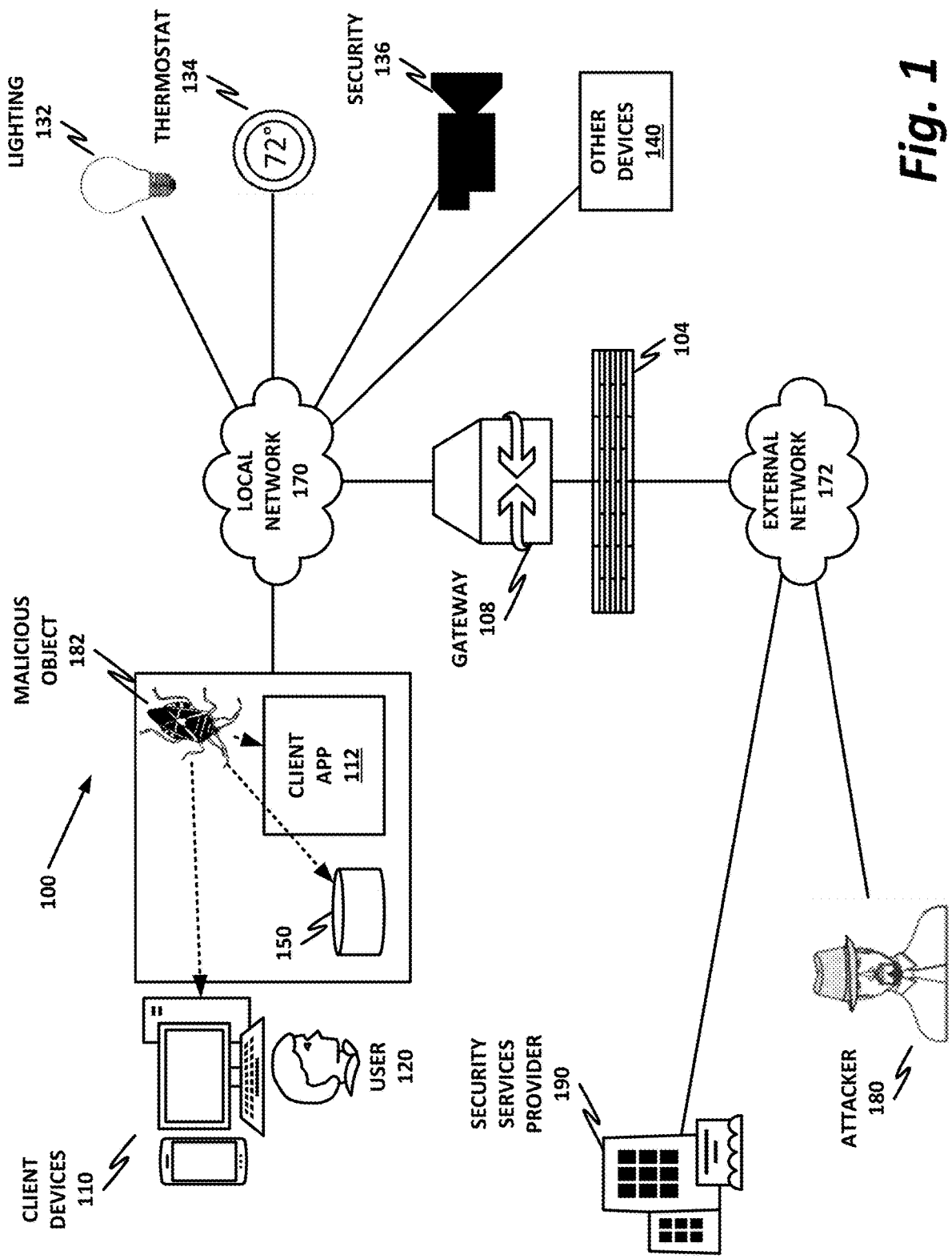
FIG. 1 is a block diagram illustrating selected elements of a security ecosystem.

In an example, there is disclosed a computing apparatus, comprising: a hardware platform comprising a processor and a memory; a closed operating system comprising instructions within the memory to sandbox userspace applications; and a sandboxed userspace application, comprising: instructions to provide a user interface and user application code; and an agentless security library within the sandboxed userspace application, the agentless security library comprising instructions to provide security or privacy services to the sandboxed userspace application with minimal direct interaction from the user interface and user application code.

EMBODIMENTS OF THE DISCLOSURE

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments may have different advantages, and no particular advantage is necessarily required of any embodiment.

Traditional security services from a vendor like MCA-FEE, LLC may include a security agent running on a device. The security agent is generally designed to have privileged access to system processes, file systems, devices, and other components. With this privileged access, the security agent can monitor activity on the system, intercept malicious activity, and provide other services including antivirus, anti-malware, anti-adware, parental controls, or other services that increase the security or utility of the system.

A recent move toward tightly locked down or "closed" operating systems, particularly for mobile devices, has complicated the design of security agents for these types of devices. In a closed operating system, each individual application is sandboxed from the system as a whole and from every other application. In this type of operating system, the sandboxed application has its own dedicated memory space, its own dedicated disk space, and restricted access to devices and system services. This type of approach has both benefits and downsides. One benefit is that the application carries with it its own binary image, and its own support utilities and libraries. Because the application image has its own libraries, there is less danger of conflicts, as may occur in more open operating systems. Open operating systems may provide shared object libraries or dynamic link libraries (DLLs) in different versions, where some applications require a certain version of a library and another application may require a different version, and one version may break one application or the other. Sandboxing of applications can also help to increase security. Because applications are limited to their sandboxed environments, an application has limited ability to cause havoc on the system as a whole. Any mischief may be limited to the sandboxed environment.

However, sandboxed applications also carry more overhead. Because each application must carry its own libraries, these libraries may be duplicated, thus eliminating one of the benefits of DLLs or shared object libraries. Furthermore, while the sandboxed environment limits the ability of the sandboxed application to cause havoc on the overall system, it does not in itself provide a completely secure solution. For example, even a sandboxed application may link a great deal of personally-identifying information (PII) from a user, particularly if the user grants the application access to resources such as the user's contacts, or provides personal or sensitive information such as a Social Security number, banking information, or other PII that may be used to compromise the user's identity, finances, or privacy.

Thus, even in a closed operating system, there may be great need for a useful security agent such as the security agents provided by MCAFEE, LLC. However, because the security agent itself is an application, if it is run in a sandboxed environment, then it has limited ability to perform traditional security services, such as inspecting processes, intercepting or hooking operating system calls, or otherwise performing privileged tasks that may be necessary to provide heightened security. This security agent may be able to provide some limited security functionality. For example, it could provide a localized client side only virtual private network (VPN), which may be provided as part of the traditional network stack, and thus may be able to inspect network traffic and provide some security services. However, operating system hooks, process inspection, and other deep security features may be unavailable in this case.

In an embodiment of an agentless security system, security services may be provided on a device with a closed operating system. Rather than providing a security agent that runs as a privileged background process on the system, security services are provided via an agentless software development kit (SDK). The agentless SDK may be statically or dynamically linked to a sandboxed application at development time or at compile-time, which ensures that the security services provided by the agentless security SDK are included within the sandboxed application. In an embodiment, each sandboxed application would carry its own version or copy of the agentless security SDK, and the agentless security SDK may launch when the application launches.

This agentless security SDK may be able to provide many of the same types of services that are provided by a traditional security agent. However, the agentless SDK may provide those services only for and within the context of the single sandboxed application. Thus, that single sandboxed application may be secured by the agentless SDK. If other applications on the same platform also need to be secured, then the developers of those applications may build them by including the agentless security SDK, and may thus provide security for those applications as well.

One feature of an agentless SDK described herein is that the application developer need not be a security expert, or have deep knowledge of how to use the agentless SDK. Rather, the agentless SDK may be included in a build project via straightforward and traditional means, such as by adding the agentless SDK library to the build project, or by using an include directive to include it in a project. Once the agentless SDK library is included in the project, a single point of entry may be provided to initiate agentless security services. For example, in one embodiment the include directive may point to a macro that automatically causes agentless security services to be launched when the application is launched. These agentless SDK services may then run in the background and provide security or privacy services similar to those provided by a traditional security agent. In other embodiments, the application programmer may need invoke only a single procedure call (e.g., StartSecurityServices( )) to initiate the security services. Once the security services are invoked, the application programmer need not give further thought to the agentless security SDK. The security services run in the background (e.g., in a separate thread) without further direct action by the application programmer.

The use of the agentless security SDK provides benefits both to the application programmer and the end user. For example, a security services provider may provide a certification program, wherein an application that is shown to properly invoke the agentless SDK is issued a certificate certifying that the application complies with the usage requirements for the agentless security SDK. This gives the application programmer a selling point for the application, namely that the end user can trust that the application is secure. This also gives benefits to the end user, in that the end user can trust that the application programmer has not deliberately or inadvertently included code that will compromise the user's security or privacy. This is a concern, because application programmers generally reuse many different libraries to perform useful functions. There may be little or no trust verification between the application programmer and the provider of the library. Rather, the application programmer may simply determine that the library provides a useful function and invoke the library in his application. However, the application programmer may not have good visibility into the library, itself. For example, the library could collect PII or other sensitive information from the user, install malware, install adware, or otherwise compromise the security or privacy of the end user of the device. Thus, the application programmer need not even be malicious to take malicious action on the user's device. However, if the application programmer also invokes the agentless security SDK, then the agentless security SDK library can intercept procedures, monitor activity, and otherwise determine whether malicious or suspicious activity is taking place. Thus, each application programmer need not be a security expert to provide a secure application. Rather, by including the agentless security SDK and invoking the single point of entry, the application programmer provides adequate security to the application without having to worry about the details of how security is provided.

Recent news stories and headlines have shown the importance of user security and privacy. Recently, there have been a number of high profile user data leaks from even large and sophisticated enterprises. Thus, privacy considerations are becoming a greater concern to end users. A driver for user data leaks is the user's lack of control over PII information collected by various applications, which may be transferred outside of the application. Once the data are transferred outside of the application, users lose control over their PII. Furthermore, the European Union (EU) has recently passed and instituted the General Data Protection Regulation (GDPR), and other jurisdictions are considering similar laws and regulations. Thus, it is becoming harder for a developer to follow the GDPR guidelines and ensure compliance. As stated above, an application developer may be out of compliance with the GDPR simply by including a library that leaks personal or security data, with no malicious intent on the developer's part. Furthermore, application developers want to focus on developing applications, not on becoming legal experts in international law.

Such application developers have limited solutions available to them for privacy, regulatory compliance, PII management, and security. This is particularly true in the case of a closed operating system, wherein the application programmer cannot rely on a third-party security agent to provide security and privacy services. Even using a VPN to protect communication may not be sufficient to prevent applications from leaking end user PII. Thus, many developers are being exposed to increasing legal risk due to the changing and evolving regulatory and policy landscape.

Unfortunately, many application developers, and particularly mobile application developers, lack sophisticated knowledge of how to implement security correctly inside of applications. As described above, when they use third-party libraries or SDKs for which they have no knowledge of the internal implementation, they are essentially giving up control over what their application does. These third-party libraries or SDKs may perform restricted or illegal activities without the application developer even knowing. Furthermore, high-grossing application developers also have a growing problem of hackers breaking into their applications' networking protocols to get services for free, or to share free versions of the applications on special "hacked app store" websites.

Another concern is for mature markets, where many of the applications provide similar functionality and developers are looking for a feature to differentiate their application. To a discriminating user, a security certification may be a major differentiator to the advantage of the application developer.

An agentless security SDK could also provide other useful features such as parental controls. Many operating systems are currently adopting some level of parental controls. However, if parental controls are adopted at the application level, then parents may be given more fine-tuned or fine-grained access overseeing what their children use and do. For example, on a more open operating system such as Android, a parental control app allows parents to restrict individual applications, provide a "bedtime," and even see individual text messages that their children and teens are sending and receiving. However, on a closed operating system such as iOS, the very same parental control application may provide extremely limited visibility to the parent. The parental control app MMGuardian is an illustrative example. If a parent installs MMGuardian on a teenager's Android phone, then the user has fine-grained control over restricting applications, including restricting individual applications at certain times of day, shutting the phone off at a certain time, sending the child's location, and getting a copy of every single text message that the child sends or receives on the phone. On the other hand, the MMGuardian parental control app on an iPhone gives the parent very limited capabilities, and notably lacks the ability to provide the parent with a copy of sent and received text messages, or other fine-grained application control. However, if applications are built using an agentless security SDK with a parental control mechanism built-in, then those parental control mechanisms can be propagated to the parents, and the parents can provide greater safety for their children in a dangerous online world.

Many parents would like to have a means to control and manage their children's usage of various apps. While operating systems themselves may have "vanilla" rules for application control, it is beneficial to take into consideration the network environment, security and privacy risks, and other data or personal security risks that the child or the device may be exposed to. An agentless security SDK can provide advanced parental controls with more rules and policies than are generally available with the plain vanilla operating system, currently.

Furthermore, the issues above are not unique to iOS. For example, Android Q is moving toward a more closed operating system structure, as are even some desktop operating systems, such as Mac OS X and certain versions of Windows that are moving more toward an app store-centric structure with fewer open options for the end user. Under a closed operating system, it may not be possible to implement traditional security agents as an external process that monitors other applications, processes, or files on the device. Each application is limited to its own sandbox, and so would be the security agent.

Under a closed operating system, device-level security and/or privacy implementations are essentially limited to the use of a VPN, which allows firewall-like functionality. However, this has limited ability to prevent PII leakage. For security, this requires a complex server-side system that is limited in its knowledge of the actual contexts on the data flows. This server-side system is therefore limited in its ability to provide value.

The present specification provides an agentless security SDK that provides a solution for both privacy and security, as well as additional functionality such as parental controls. This functionality is provided from within the application itself. In some embodiments, the agentless security SDK of the present specification provides protection for the end user by enforcing best practices as well as by taking action (without end user or even application programmer interaction) based on one or more security statuses. For example, if a problem is detected, the agentless security SDK can take autonomous action to remedy the problem. A problem in this context could be a security threat, a breach of best security practices, a breach of privacy, an error or mistake in programming, or any other issue that affects user privacy or security. Thus, even a poorly-developed application (such as one developed by an amateur looking to cash in on the latest craze) can be shipped with reliable, enterprise-grade security and privacy protections simply by including the agentless security SDK.

This provides functionality that may not otherwise be available to a traditional security agent via a closed operating system.

The agentless SDK of the present specification incorporates technologies for network protection and detection. For example, the agentless SDK could detect whether a user's Wi-Fi connection is under attack. The agentless SDK may also enforce correct security implementation (certificate pinning, for example), which may be significantly superior to what the application programmer may do on his own. Effectively, the antivirus or security agent is placed inside the application and becomes part of the application process. This allows the agentless SDK to do more than a security agent could do on a closed operating system.

The agentless SDK may take action automatically and may potentially alter the application's behavior according to the environment's security status. As described above, a similar mechanism can be used to implement parental control over the application.

The agentless SDK may also provide better ability to alert the user within the application context instead of an external notification, which might be unavailable (e.g., if the user has turned off notifications), or which the user may simply brush aside. In some embodiments, application developers may be provided anonymized or limited reporting data of detected events and actions. This can help the application developer to develop more secure applications, and may notify the application developer if he is using third-party libraries that are compromising security. In some embodiments, end users may be offered a dashboard view of the security state, which educates the user and shows the value of using applications that include the agentless security SDK. Furthermore, with user consent, the agentless security SDK could monitor application behavior over time and provide additional analysis and services. For example, the system could track historical URLs or domains that applications access, use machine learning analysis to better detect anomalies, or offer upsell services to protect the user against detected vulnerabilities.

In at least some embodiments, the application user interface (UI) can be altered or reconfigured to make security notifications non-dismissible. A common notification can usually be dismissed, or even disabled according to user configuration options. But the agentless security SDK can provide notifications (for example, for critical security or privacy issues) that cannot be disabled, and that cannot be immediately dismissed. For example, the notification may require some user action before it is dismissed. This can help to ensure that the user does not simply ignore the notification, as often occurs with system notifications on computers.

The teachings of the present specification can provide both security and privacy protection in a closed operating system where an external agent may not be feasible. This may be done by creating an SDK for developers to integrate with their application in a non-intrusive and non-obstructive way. The security agent can then monitor and protect the application and the end user for both security and privacy. This approach allows an implementation of policies and enforcements that can also supplement parental controls. This also allows a security vendor to integrate functionality into the application, including authentication services, advertising, social networking, or other services if desired by the end user.

A system and method for providing agentless security will now be described with more particular reference to the attached FIGURES. It should be noted that throughout the FIGURES, certain reference numerals may be repeated to indicate that a particular device or block is referenced multiple times across several FIGURES. In other cases, similar elements may be given new numbers in different FIGURES. Neither of these practices is intended to require a particular relationship between the various embodiments disclosed. In certain examples, a genus or class of elements may be referred to by a reference numeral ("widget 10"), while individual species or examples of the element may be referred to by a hyphenated numeral ("first specific widget 10-1" and "second specific widget 10-2").

FIG. 1 is a block diagram of a security ecosystem 100. Security ecosystem 100 illustrates an ecosystem in which security may be advantageous. Security could be provided by any number of means, including via a security agent, or an agentless security SDK, according to the teachings of the present specification.

In the example of FIG. 1, security ecosystem 100 may be an enterprise, a government entity, a data center, a telecommunications provider, a "smart home" with computers, smart phones, and various internet of things (IoT) devices, or any other suitable ecosystem. Security ecosystem 100 is provided herein as an illustrative and nonlimiting example of a system that may employ, and benefit from, the teachings of the present specification.

Within security ecosystem 100, one or more users 120 operate one or more client devices 110. A single user 120 and single client device 110 are illustrated here for simplicity, but a home or enterprise may have multiple users, each of which may have multiple devices, such as desktop computers, laptop computers, smart phones, tablets, hybrids, or similar.

Client devices 110 may be communicatively coupled to one another and to other network resources via local network 170. Local network 170 may be any suitable network or combination of one or more networks operating on one or more suitable networking protocols, including a local area network, a home network, an intranet, a virtual network, a wide area network, a wireless network, a cellular network, or the internet (optionally accessed via a proxy, virtual machine, or other similar security mechanism) by way of nonlimiting example. Local network 170 may also include one or more servers, firewalls, routers, switches, security appliances, antivirus servers, or other network devices, which may be single-purpose appliances, virtual machines, containers, or functions. Some functions may be provided on client devices 110.

In this illustration, local network 170 is shown as a single network for simplicity, but in some embodiments, local network 170 may include any number of networks, such as one or more intranets connected to the internet. Local network 170 may also provide access to an external network, such as the internet, via external network 172. External network 172 may similarly be any suitable type of network.

Local network 170 may connect to the internet via gateway 108, which may be responsible, among other things, for providing a logical boundary between home network 172 and external network 170. Local network 170 may also provide services such as dynamic host configuration protocol (DHCP), gateway services, router services, and switching services, and may act as a security portal across local boundary 104.

Local network 170 may also include a number of discrete IoT devices. For example, local network 170 may include IoT functionality to control lighting 132, thermostats or other environmental controls 134, a security system 136, and any number of other devices 140. Other devices 140 may include, as illustrative and nonlimiting examples, network attached storage (NAS), computers, printers, smart televisions, smart refrigerators, smart vacuum cleaners and other appliances, and network connected vehicles.

Local network 170 may communicate across local boundary 104 with external network 172. Local boundary 104 may represent a physical, logical, or other boundary. External network 172 may include, for example, websites, servers, network protocols, and other network-based services. In one example, an attacker 180 (or other similar malicious or negligent actor) also connects to external network 172. A security services provider 190 may provide services to local network 170, such as security software, security updates, network appliances, or similar. For example, MCAFEE, LLC provides a comprehensive suite of security services that may be used to protect local network 170 and the various devices connected to it.

It may be a goal of users 120 to successfully operate devices on local network 170 without interference from attacker 180. In one example, attacker 180 is a malware author whose goal or purpose is to cause malicious harm or mischief, for example, by injecting malicious object 182 into client device 110. Once malicious object 182 gains access to client device 110, it may try to perform work such as social engineering of user 120, a hardware-based attack on client device 110, modifying storage 150 (or volatile memory), modifying client application 112 (which may be running in memory), or gaining access to local resources. Furthermore, attacks may be directed at IoT objects. IoT objects can introduce new security challenges, as they may be highly heterogeneous, and in some cases may be designed with minimal or no security considerations. To the extent that these devices have security, it may be added on as an afterthought. Thus, IoT devices may in some cases represent new attack vectors for attacker 180 to leverage against local network 170.

Malicious harm or mischief may take the form of installing root kits or other malware on client devices 110 to tamper with the system, installing spyware or adware to collect personal and commercial data, defacing websites, operating a botnet such as a spam server, or simply to annoy and harass users 120. Thus, one aim of attacker 180 may be to install his malware on one or more client devices 110 or any of the IoT devices described. As used throughout this specification, malicious software ("malware") includes any object configured to provide unwanted results or do unwanted work. In many cases, malware objects will be executable objects, including, by way of nonlimiting examples, viruses, Trojans, zombies, rootkits, backdoors, worms, spyware, adware, ransomware, dialers, payloads, malicious browser helper objects, tracking cookies, loggers, or similar objects designed to take a potentially-unwanted action, including, by way of nonlimiting example, data destruction, data denial, covert data collection, browser hijacking, network proxy or redirection, covert tracking, data logging, keylogging, excessive or deliberate barriers to removal, contact harvesting, and unauthorized self-propagation. In some cases, malware could also include negligently-developed software that causes such results even without specific intent.

In enterprise contexts, attacker 180 may also want to commit industrial or other espionage, such as stealing classified or proprietary data, stealing identities, or gaining unauthorized access to enterprise resources. Thus, attacker 180's strategy may also include trying to gain physical access to one or more client devices 110 and operating them without authorization, so that an effective security policy may also include provisions for preventing such access.

In another example, a software developer may not explicitly have malicious intent, but may develop software that poses a security risk. For example, a well-known and often-exploited security flaw is the so-called buffer overrun, in which a malicious user is able to enter an overlong string into an input form and thus gain the ability to execute arbitrary instructions or operate with elevated privileges on a computing device. Buffer overruns may be the result, for example, of poor input validation or use of insecure libraries, and in many cases arise in nonobvious contexts. Thus, although not malicious, a developer contributing software to an application repository or programming an IoT device may inadvertently provide attack vectors for attacker 180. Poorly-written applications may also cause inherent problems, such as crashes, data loss, or other undesirable behavior. Because such software may be desirable itself, it may be beneficial for developers to occasionally provide updates or patches that repair vulnerabilities as they become known. However, from a security perspective, these updates and patches are essentially new objects that must themselves be validated.

Local network 170 may contract with or subscribe to a security services provider 190, which may provide security services, updates, antivirus definitions, patches, products, and services. MCAFEE, LLC is a nonlimiting example of such a security services provider that offers comprehensive security and antivirus solutions. In some cases, security services provider 190 may include a threat intelligence capability such as the global threat intelligence (GTI™) database provided by MCAFEE, LLC, or similar competing products. Security services provider 190 may update its threat intelligence database by analyzing new candidate malicious objects as they appear on client networks and characterizing them as malicious or benign.

Other security considerations within security ecosystem 100 may include parents' or employers' desire to protect children or employees from undesirable content, such as pornography, adware, spyware, age-inappropriate content, advocacy for certain political, religious, or social movements, or forums for discussing illegal or dangerous activities, by way of nonlimiting example.

Figure 2:
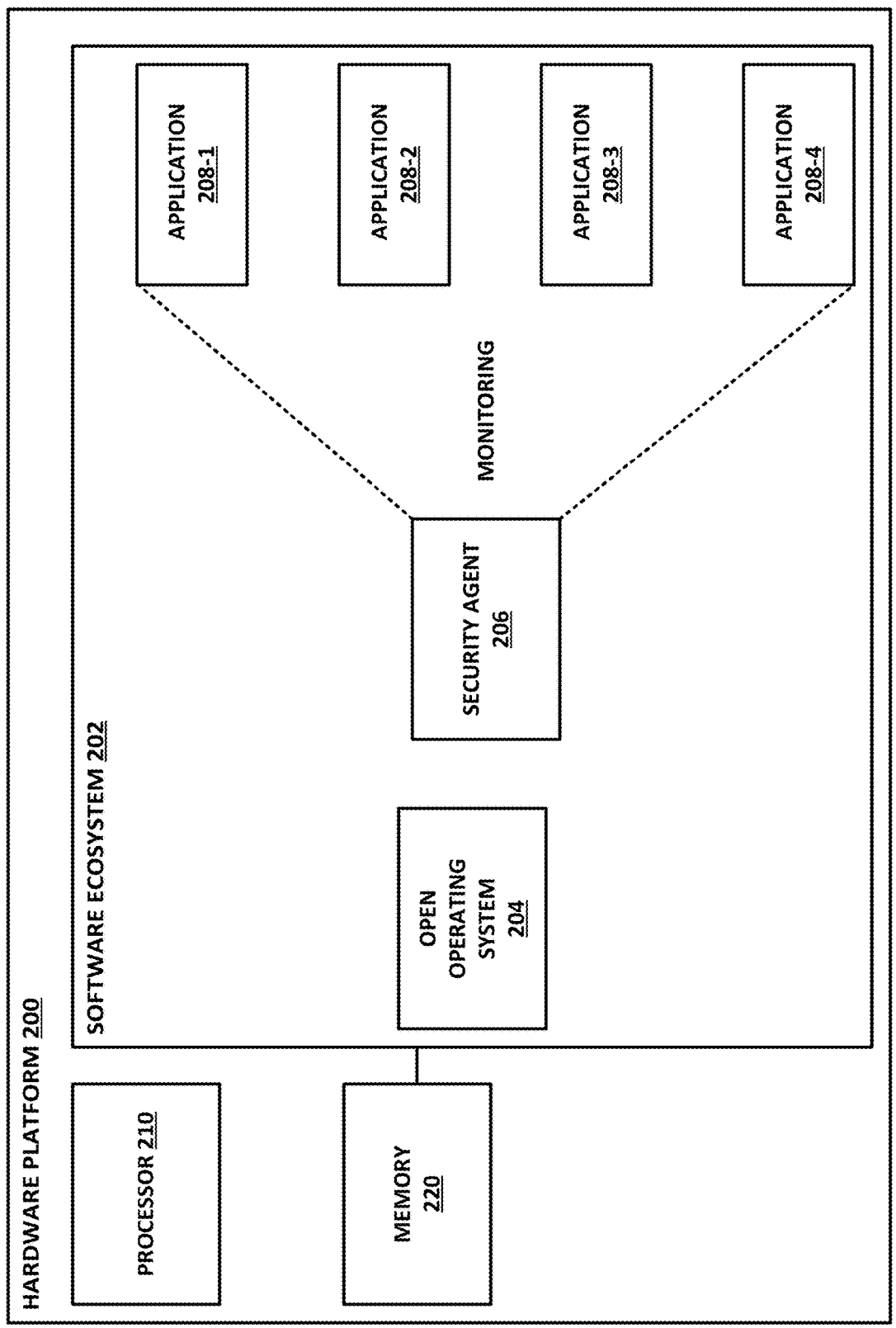
FIG. 2 is a block diagram of a hardware platform.

FIG. 2 is a block diagram of a hardware platform 200. In this illustration, hardware platform 200 includes a processor 210, which may be configured to execute arbitrary instructions according to an instruction architecture. Stored within memory 220 is a set of instructions for providing various programs and functions. Specifically in this context, memory 220 hosts a software ecosystem 202. Software ecosystem 202 provides a software platform for executing a number of applications useful to the user, such as applications 208-1, 208-2, 208-3, 208-4. Software ecosystem 202 also provides an open operating system 204.

In this case, because open operating system 204 is able to host a variety of different types of applications, a security agent 206 can be provided within software ecosystem 202. Security agent 206 may operate with elevated system privileges, such as a lower-level "ring" in a ring protection architecture. Because security agent 206 operates with elevated privileges, security agent 206 can intercept interprocess communications (IPCs) between applications 208 (e.g., an IPC between application 208-1 and application 208-2). Security agent 206 can also scan a hard disk, provide or modify a network stack, inspect the binary code of applications 208, and provide operating system hooks that allow security agent 206 to closely monitor applications 208 within software ecosystem 202.

Figure 3:
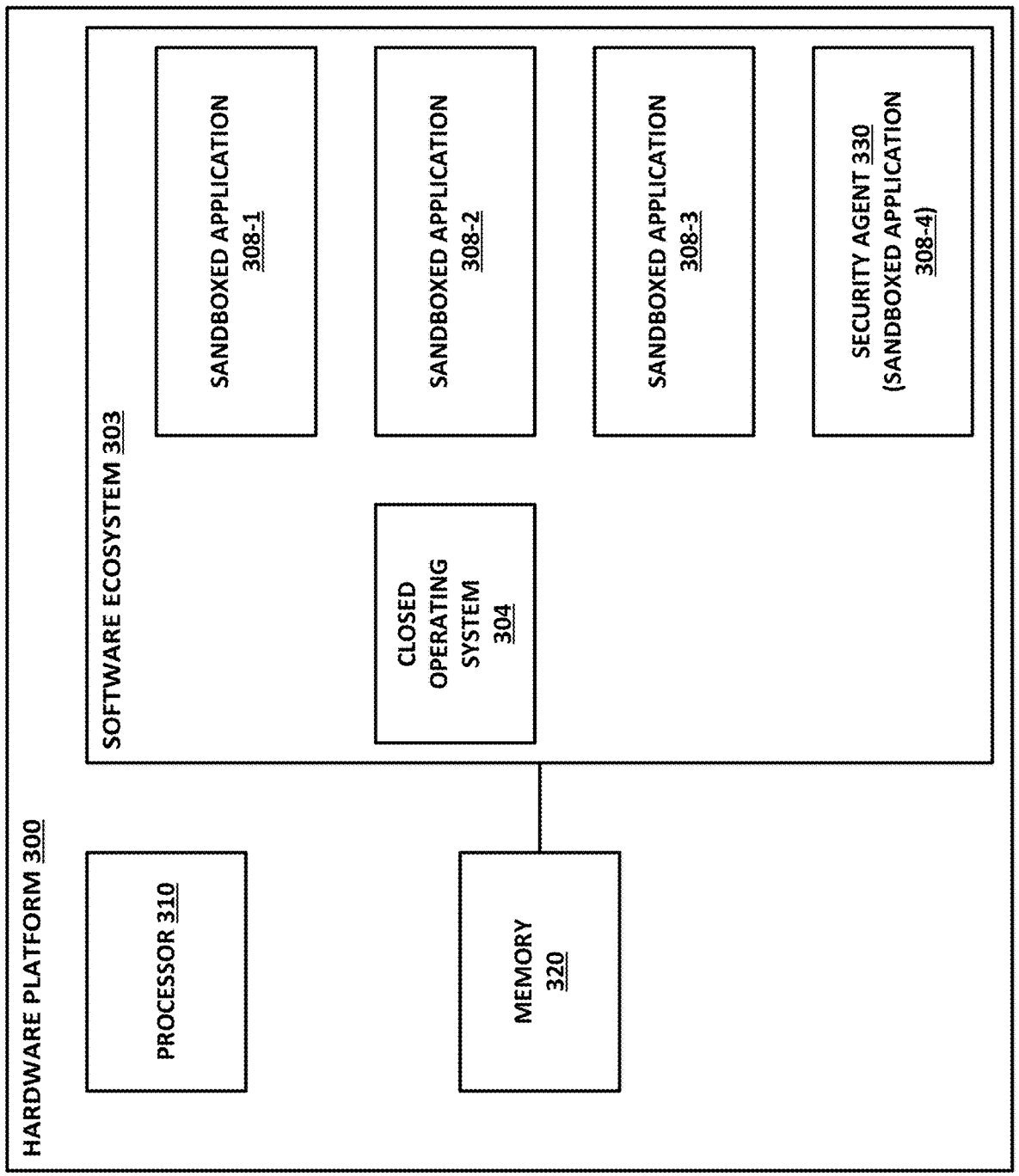
FIG. 3 is a block diagram of an alternate embodiment of a hardware platform.

FIG. 3 is a block diagram of a hardware platform 300. Hardware platform 300 is similar to hardware platform 200 of FIG. 2. For example, hardware platform 300 provides a processor 310, a memory 320, and a security agent 330. Processor 310 may execute arbitrary instructions according to an instruction set architecture. Memory 320 hosts a software ecosystem 303. Software ecosystem 303 includes a closed operating system 304. Closed operating system 304 does not provide standard applications. Rather, at least some applications within closed operating system 304 are sandboxed applications 308. In this example, all of the illustrated applications are sandboxed applications, namely sandboxed applications 308-1, 308-2, 308-3, and 308-4. Because applications 308 are sandboxed from one another, it is more difficult to provide a security agent similar to security agent 206 of FIG. 2. While it is possible to provide a security agent 330 within software ecosystem 303, the nature of closed operating system 304 means that the security agent 330 would have more limited functionality. For example, a security agent 330 would operate itself as a sandboxed application 308 (in this case, sandboxed application 308-4). Therefore, it would not have privileges to inspect IPCs (e.g., an IPC between sandboxed application 308-1 and sandboxed application 308-2). A security agent 330 could provide a VPN within the network stack, which may provide some security functions, but it would have limited ability to inspect private data. In particular, data sent outside of sandboxed applications 308 may be encrypted within the sandboxed application. The security agent 330 would therefore not be able to inspect the traffic as a normal security agent would do.

As described above, a security agent 330 could be provided within software ecosystem 303, and indeed may be provided within software ecosystem 303. However, because security agent 330 has more limited functionality than security agent 206 of FIG. 2, the functionality of security agent 330 may be supplemented or replaced. For example, instead of (or in addition to) security agent 330, at least some sandboxed applications 308 may be built using an agentless security SDK. In that case, each sandboxed application 308 may provide its own security. Specifically, one or more sandboxed applications 308 may have been built with an agentless security SDK, which may provide a single point of entry for security services. Once the single point of entry is invoked, the agentless security SDK provides security services to the sandboxed application 308 hosting the agentless security SDK.

Figure 4:
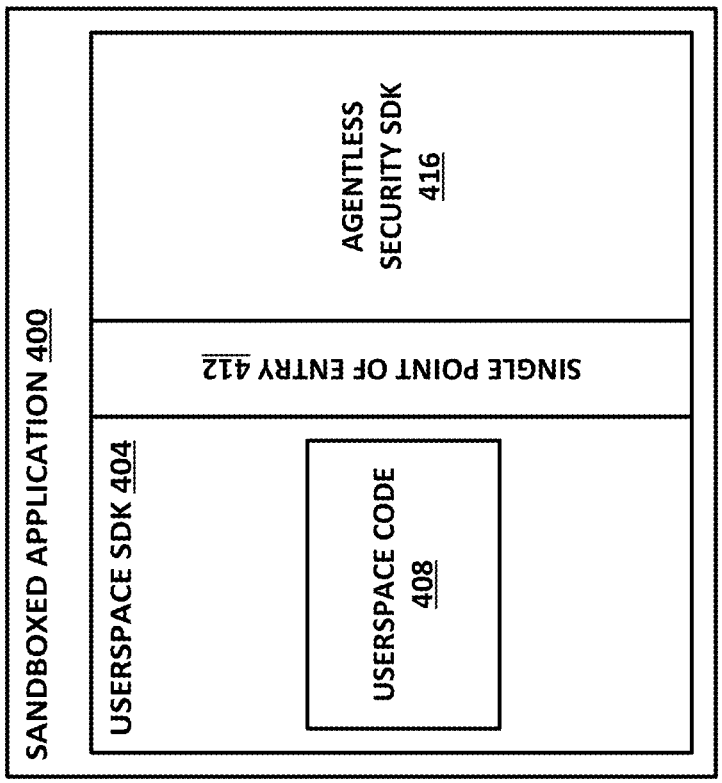
FIG. 4 is a block diagram of a sandboxed application.

FIG. 4 is a block diagram of a sandboxed application 400. Sandboxed application 400 may be built using a userspace SDK 404. Userspace SDK 404 is a traditional SDK that provides the functions that enable the application programmer to provide an application that is useful to the end user. Userspace SDK 404 may provide such facilities as a network stack, file and disk access, memory management, user interface elements, and other libraries that may provide userspace functions. The system programmer writes userspace code 408 to take advantage of elements of userspace SDK 404. In most cases, it takes some level of skill for the application programmer to write userspace code 408 so as to provide a useful application via userspace SDK 404.

In creating sandboxed application 400, the application programmer may also invoke agentless security SDK 416. Agentless security SDK 416 provides objects, routines, methods, and other code that handles security for sandboxed application 400.

In at least some embodiments, a single point of entry 412 is provided for invoking agentless security SDK 416. In other words, it may not be necessary for the application programmer to write userspace code 408 to take advantage of the features of agentless security SDK 416. Rather, by invoking single point of entry 412, the system programmer may gain the full benefit of agentless security SDK. Single point of entry 412 could be a header file or other included file with macros or directives to invoke the single point of entry. In other embodiments, single point of entry 412 could be a single macro or procedure that the application programmer calls, for example, early in the main program procedure to invoke the security services. Once the security services of agentless security SDK 416 are invoked, they may run in the background without further interaction from userspace code 408 or userspace SDK 404. In some examples, the procedures of agentless security SDK 416 may run in one or more separate application threads from the main procedure.

Advantageously, by invoking agentless security SDK 416, the application programmer gains the full benefit of the agentless security SDK, without having to have a deep knowledge of security procedures. For example, agentless security SDK may enforce authentication protocols, may observe processes for collection of PII, may inspect the network stack, may watch for Wi-Fi hijacking, may provide a localized VPN which may or may not be encrypted, may provide a localized client-only VPN which may or may not be encrypted, and may provide other services.

In some embodiments, a vendor providing agentless security SDK 416 may provide a certification program, wherein sandboxed applications 400 that properly invoke agentless security SDK 416 are certified. Once an application is certified, the application vendor may be entitled to provide a notice, such as a shield, certificate, or other trademark symbol issued by the security services vendor. In some cases, the sandboxed application 400 may also be issued a digital certificate that can be verified by the security vendor so that end users can confidently install the application and know that it complies with security requirements.

In one embodiment, sandboxed application 400, via agentless security SDK 416, can be certified when agentless security SDK 416 communicates with a cloud service and reports that the application has invoked single point of entry 412. In cases where a single point of entry 412 is used, this may be sufficient to indicate that agentless security SDK 416 has been launched along with sandboxed application 400, and is providing security services. Where more details are required, sandboxed application 400 may write out an output file or log, such as in JavaScript Object Notation (JSON) or other format, and provide the logging data to the security vendor. The security vendor can then use the logging data to certify that sufficient security services are being provided. This additional verification may be used either with or without a single point of entry 412.

In the case of legal compliance, such as GDPR or other compliance, a log file can also be used to certify that user data such as PII are not being collected. Advantageously, the security vendor may then provide the application developer with a certificate indicating and certifying that the application is compliant with the GDPR or with other regulations. This can help to ease legal compliance obligations on the part of application developers, and can provide on behalf of the application developer proof of due diligence. Specifically, on the assumption that agentless security SDK 416 provides the minimum legally necessary data protections, then by certifying that sandboxed application 400 invokes agentless security SDK 416 (e.g., via single point of entry 412), the application developer may be able to prove that he has taken sufficient minimum care with the end user's data.

In some cases, a log file can be generated or stored in the cloud. Furthermore, the log file can be used not only to certify the vendor's compliance, but can also be used to help the vendor with internal security practices. The log file may certify not only that the app developer has properly invoked the agentless security SDK, but may also provide tracking of actions taken by the SDK in response to the application. This means that an app developer who is sincerely interested in improving her application can receive feedback that will indicate what privacy or security breaches arise. For example, the agentless security SDK may detect failure to follow best practices, malicious or negligent action by another SDK, data leaks, compromise by malware, or other errors. The security vendor may communicate this information to the developer, such as by providing her with access to the log file, and the developer can then improve the application.

In some embodiments, the application developer may also register an account with the security services provider, and may have access to a dashboard, such as an online or local dashboard. Thus, she can observer her log files, observe blocked behavior of her application, and otherwise improve her programming.

Figure 5:
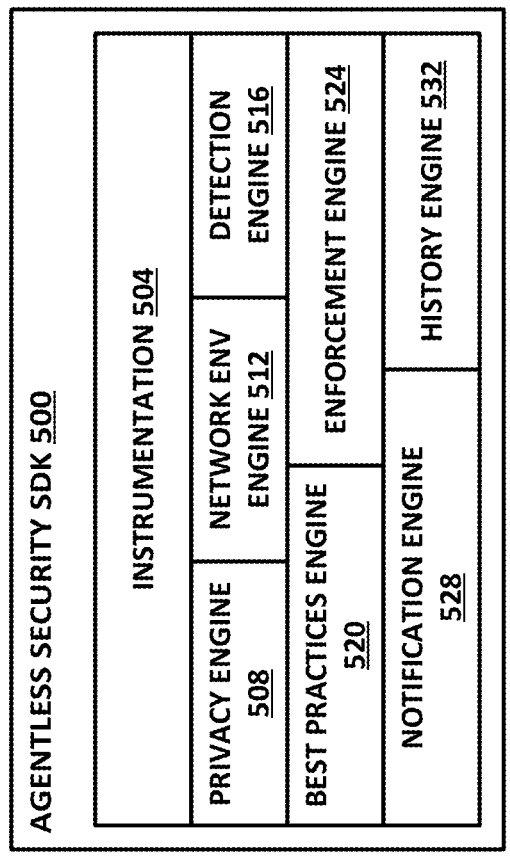
FIG. 5 is a block diagram of selected elements of agentless security software development kit (SDK).

FIG. 5 is a block diagram of selected elements of agentless security SDK 500. Agentless security SDK 500 may be any of the agentless security SDKs discussed throughout this specification.

In this example, agentless security SDK 500 includes a number of components. The components illustrated here are not intended to be exhaustive or limiting, but rather are provided by way of illustration as nonlimiting examples. Various embodiments of agentless security SDKs 500 may include some or all of the components illustrated herein, and may also optionally include other components as desired for the specific embodiment. It should be noted that not all of the illustrated elements need be present to constitute an agentless security SDK 500.

In this embodiment, agentless security SDK 500 includes instrumentation 504, privacy engine 508, network environment engine 512, detection engine 516, best practices engine 520, enforcement engine 524, notification engine 528, and history engine 532.

Instrumentation 504 is a part of the SDK that directs the execution flow around inputs and outputs. These inputs and outputs are to go through agentless security SDK 500, creating a "pass-through" thin layer that both examines and potentially modifies (or completely prevents) information from exiting the application. Instrumentation may also apply to security-related operating system services, such as encryption and related services. Instrumentation layer 504 helps to make the other layers functional and effective inside the hosting application, such as a sandboxed application 400 of FIG. 4.

Some platforms such as iOS provide technology (e.g., Swizzle) to seamlessly provide instrumentation without any additional effort from the developer integrating the SDK. For example, this technology has been demonstrated on iOS.

Other platforms may require a greater cooperative effort from the developer. For example, if supporting technology is not available from the OS, the developer might need to install a plug-in to their development environment that will automate the process of altering source code to direct input and output API calls through instrumentation layer 504, to achieve the desired result. The degree to which such external facilities may be required may depend on how openly communication threads are exposed outside of the application thread. If an external thread is able to examine and identify communication within another thread, then it may be sufficient to invoke a single point of entry without the need for an automatic code modifying tool.

Privacy engine 508 is a scanning service that determines whether a piece of data contains PII. In some embodiments, privacy engine 508 uses a cloud API or service to provide more detailed analysis, or to retrieve or cache data. The cloud API or service may be self-contained, and in one embodiment is provided via representational state transfer (REST) APIs.

Because instrumentation 504 is configured to observe data flows within the sandboxed application, all data can be captured unencrypted. The cloud service can therefore be implemented using regular expressions describing the structure of PII. When PII data are identified, a determination may be made whether it is contextually appropriate to export the PII outside of the application. If is not contextually appropriate to export the PII outside of the application, then the attempted export of PII may be intercepted and contained, or other remedial action may be taken.

Network environment engine 512 examines the current network environment for any active attacks. For example, network environment engine 512 may be able to identify secure sockets layer (SSL) strip or split attacks, or similar. This provides network environment verification services for the end user. To verify the network environment, it may use a server-side service that contains predetermined responses and certificates. If any response is not as expected, then an attack may be suspected. This is similar to what is already done in some existing agentful security services.

Once an attack is detected, an action may be activated to enforce some code execution. This may be done, for example, via network environment engine 512, or some other component.

Detection engine 516 provides security flaw detection. Detection engine 516 examines the outgoing and incoming communications to detect any known security flaws in them. It may examine and verify security certificates, and other security related flaws. Detection engine 516 may also look at the URLs the application is attempting to use, and may detect any malicious URLs. In some embodiments, detection of malicious URLs may be via a cloud service, such as McAfee Global Threat Intelligence, or some other cloud service provided by a security services provider. (See, e.g., security services provider 190 of FIG. 1.) Detection engine 516 may be tightly integrated with best practices engine 520, which enforces correct implementations.

Best practices engine 520 is a security prevention and best practices layer. Best practices engine 520 may, via instrumentation 504, gain access to all networking functionality. This allows best practices engine 520 to implement correct security practices, such as certificate pinning, enforcement of Hypertext Transfer Protocol Secure (HTTPS), and other best practices. Enforcing best networking practices implementations can help to prevent security vulnerabilities.

Enforcement engine 524 provides action and enforcement. Enforcement engine 524 listens to events produced by the other layers within agentless security SDK 500, and maps each event to one or more actions that need to be taken. The mapping itself may be highly configurable, and in some embodiments is downloaded and synchronized from the cloud to give extra flexibility in determining what to do with each event per application or developer, or is implemented according to the directives of an enterprise security administrator.

Action and enforcement can include any action or enforcement response to a security event. This could include, for example, notifying the user, means for notifying the user, modifying data, modifying networking protocols, blocking network operations, blocking the application, terminating the application, notifying an enterprise security actor, notifying a security services vendor or provider, quarantining the application, uninstalling the application, checking for other damage, or taking any other action.

Policies may be defined on the cloud and synchronized to agentless security SDK 500. In embodiments where parental controls are provided, advanced parental controls may also be provided via enforcement engine 524. Note that parental controls are illustrated herein as an example of an application, but enterprise controls may be just as useful. For example, while parental controls may be concerned with when the child or teenager uses the device, which applications are accessed, and placing limits on certain data, similar restrictions may be provided by an enterprise. For example, the enterprise may restrict access to games or other non-enterprise apps during business hours, may restrict access to certain data sources during business or nonbusiness hours, or may take other actions to prevent loss of enterprise data. Indeed, the PII protections provided herein can be adapted for data loss prevention (DLP), to prevent loss of proprietary or classified enterprise data.

Notification engine 528 may provide user notifications and history. Notification engine 528 may be responsible for displaying different types of notifications to the user, and may include manipulating the application user interface.

Notification layer 528 may also collect notifications received, as well as events provided within the SDK. These can be provided as a list of historical events to history engine 532. History engine 532 may provide historical data that can be used heuristically, or for logging purposes.

The hosting application may, in some embodiments, implement a user interface (UI) to present data from history engine 532 to the user as a list or a log file. In other examples, the SDK may provide a generic screen to provide history engine 532, and in some cases the screen may be dressed with UI elements to make it appear consistent with the overall application presentation. The generic screen may have a few simple customization points for background, fonts, and colors, which can be modified by the user or the application programmer to customize the display of the generic screen. Optionally, in parallel, the history may also be sent to the cloud on the server side, to provide a feed of historical events and actions. This can be used to strengthen the cloud services, to provide analysis, to provide enterprise-wide or global event recording, and to provide global or enterprise analytics. In some embodiments, logs sent to the cloud may themselves be stripped of PII to ensure that agentless security SDK 500 does not compromise the security of the end user.

Figure 6:
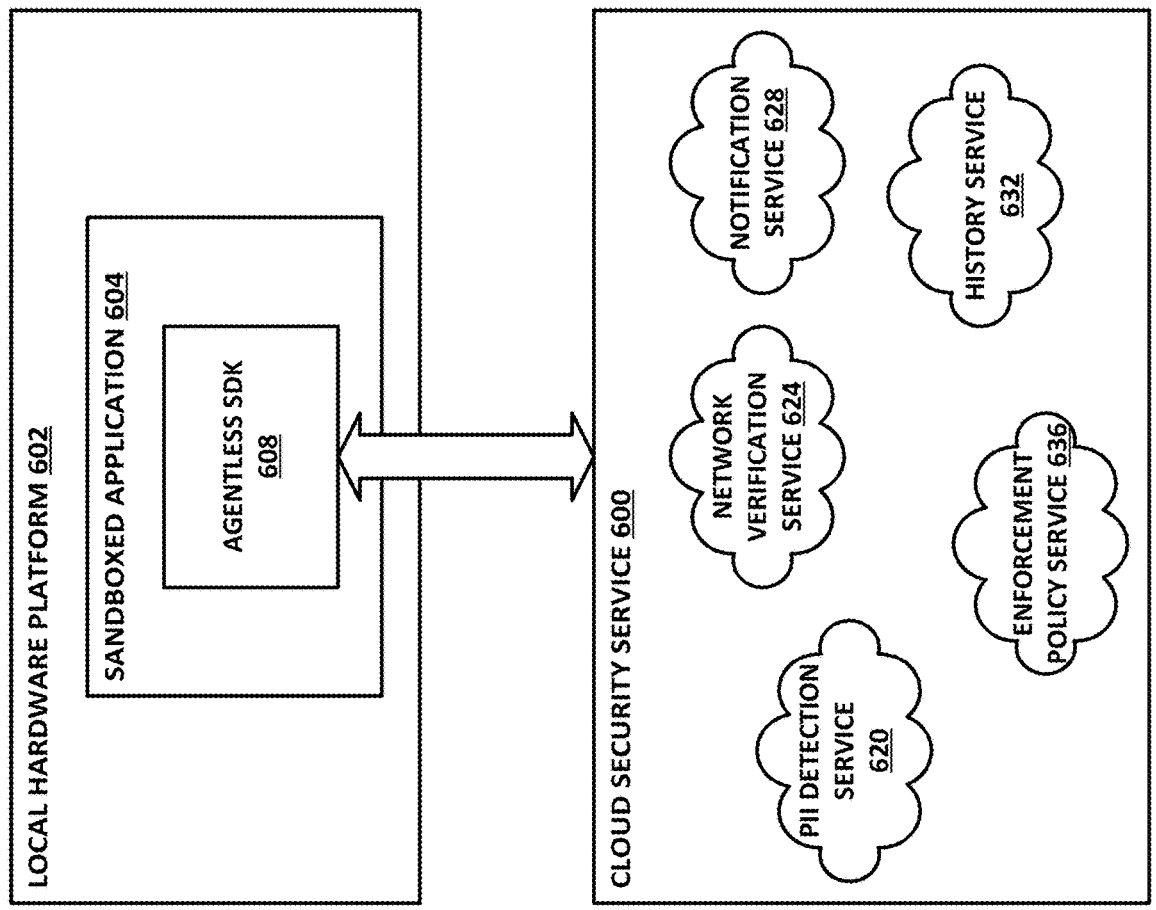
FIG. 6 is a block diagram of a cloud ecosystem.

FIG. 6 is a block diagram of a cloud ecosystem. In this example, the cloud ecosystem includes a local hardware platform 602 and a cloud security service 600. This illustrates interaction between various elements of the cloud security service 600 and local hardware platform 602.

In this illustrative embodiment, local hardware platform 602 includes a sandboxed application 604 which provides an agentless SDK 608. Agentless SDK 608 communicates with cloud security service 600.

Cloud security service 600 may provide a number of services that correspond to some of the components provided in agentless SDK 608. For example, examining agentless security SDK 500 of FIG. 5, a privacy engine 508 may be provided. Privacy engine 508 of FIG. 5 may interact with PII detection service 620 of cloud security service 600.

Similarly, networking environment engine 512 of FIG. 5 may interact with network verification service 624. Network verification service 624 may provide more detailed analytics or cloud-based security than is provided locally within agentless security SDK 508.

Notification engine 528 of FIG. 5 may interact with notification service 628 of cloud security service 600. Notification service 628 may receive notifications from notification engine 528 of FIG. 5, and may aggregate data to provide more useful global or enterprise analytics.

Enforcement engine 524 of FIG. 5 may interoperate with enforcement policy service 636. Enforcement policy service 636 provides cloud-based analytics and data for policy enforcement. Specifically, enforcement policy service 636 may provide a global, enterprise, and/or family policy for enforcement by agentless SDK 608.

History service 632 may interoperate with history engine 532 of FIG. 5. History service 632 may receive logging data from history engine 532 of FIG. 5, and may provide appropriate analytics globally, or on enterprise level.

Figure 7:
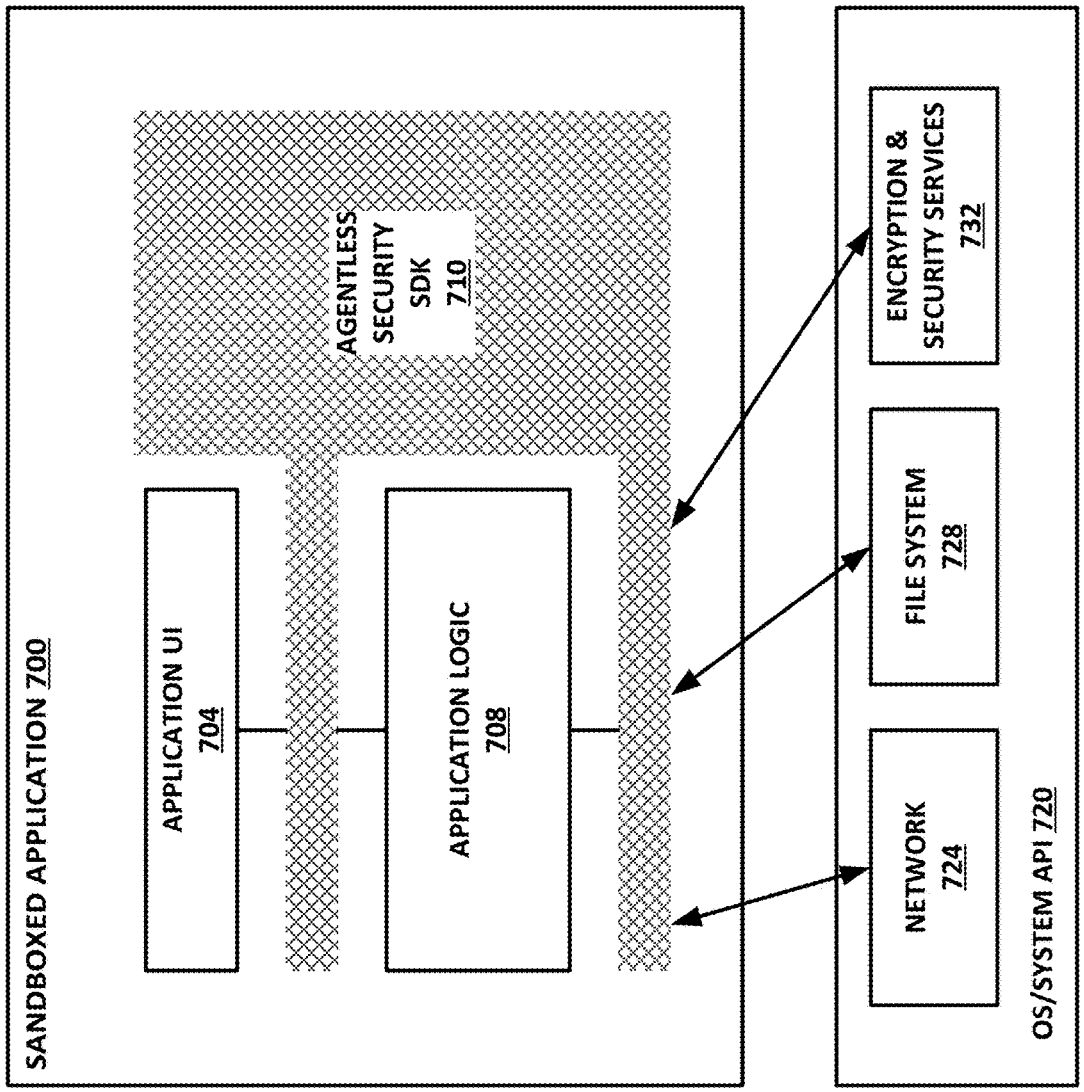
FIG. 7 is a block diagram illustrating a further embodiment of a sandboxed application.

FIG. 7 is a block diagram of a sandboxed application 700. Sandboxed application 700 includes an agentless security SDK 710.

As illustrated, sandboxed application 700 interoperates with an operating system or system APIs 720. These provide, for example, network 724, file system 728, and encryption and security services 732. Because application 700 is sandboxed, a traditional agentful security system may not be able to inspect, for example, interactions between application UI 704 and application logic 708. Furthermore, encryption and security services 732 may ensure that data sent out of sandboxed application 700 are encrypted before they are sent to network 724. Thus, an agentful security agent running on this platform may not be able to inspect those data for PII loss, or for other security indicators.

Instead, agentless security SDK 710 runs within sandboxed application 700. Agentless security SDK 710 includes intercepts between application UI 704, application logic 708, and OS or system API 720. Furthermore, agentless security SDK 710 may provide other services and operations that can run in parallel to application UI 704 and application logic 708.

By tightly integrating with sandboxed application 700, agentless security SDK 710 is able to examine or hook communications between the various elements and inspect data, while providing security services.

In some embodiments, a single point of entry is invoked by simply including a header file or a library for agentless security SDK 710. In the case of a header file, certain macros or definitions may be used to override or redirect at least some standard system calls, to ensure that they are performed with appropriate security. In other cases, a single procedure call may be used to invoke agentless security SDK 710 in the background.

The hooking or interception of communication between application UI 704, application logic 708, and operating system 720 may, in some cases, be accomplished via an OS-provided utility such as Swizzle on iOS. In cases where such a utility is not provided, some other means may be used to hook or intercept communications between processes. For example, an automated tool may be used to modify standard communication calls for operations such as reading from or writing to disk, reading from or writing to memory, accessing devices or system services, and/or reading from or writing to the network stack. In yet another embodiment, rather than rewriting those standard calls, the SDK may overload or override the standard system calls, and provide their own duplicate functions with the same procedure name. This may be permissible, so long as agentless security SDK 710 has a higher naming priority than the standard operating system calls. In this case, the application programmer can invoke standard system procedures for performing these tasks, but those invocations are intercepted by agentless security SDK 710, and security services, including lightweight security services, may be performed on those communications before the standard system call is invoked.

Figure 8:
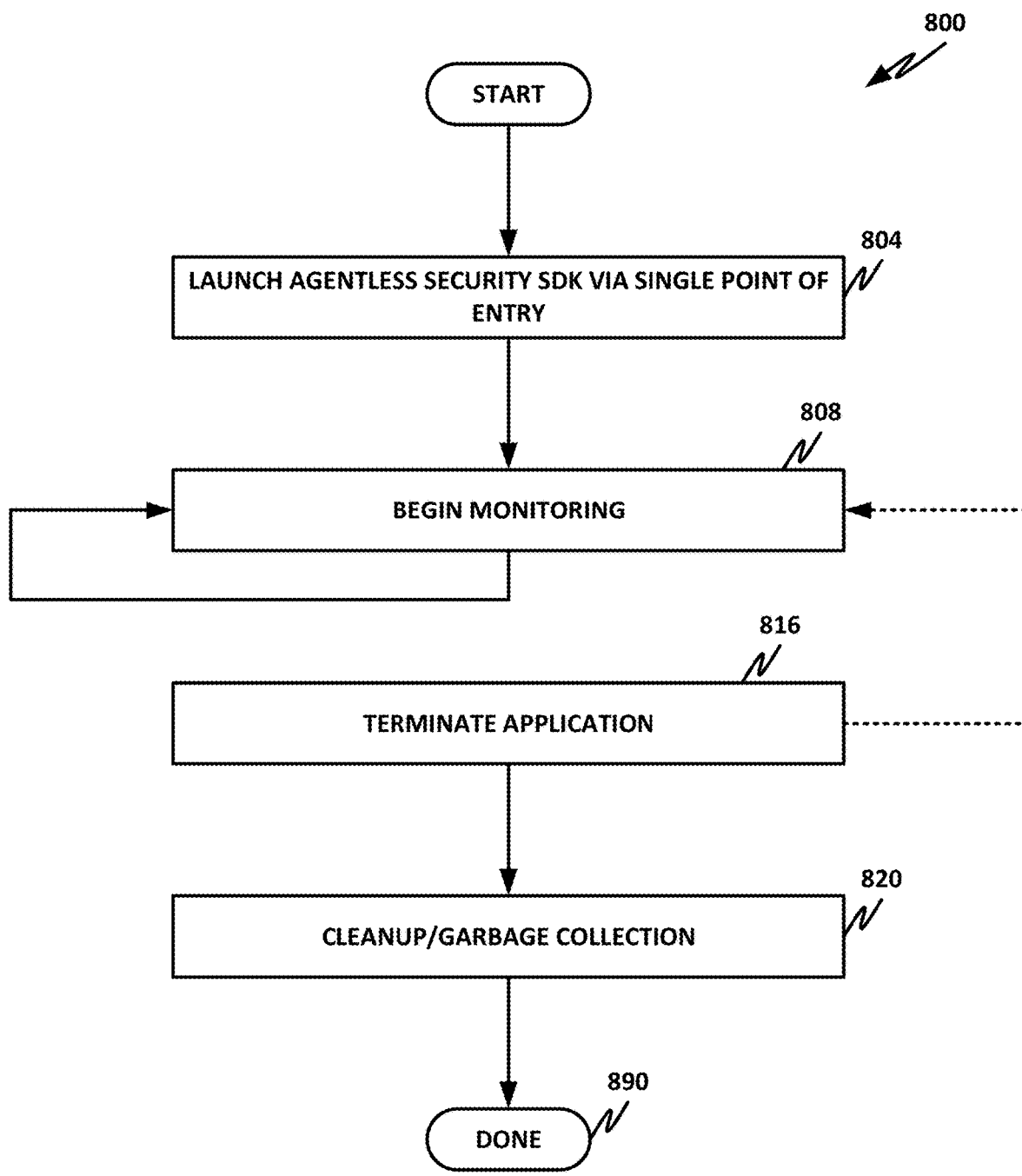
FIG. 8 is a flowchart of a method for providing an agentless security SDK.

FIG. 8 is a flowchart of a method 800 for providing an agentless security SDK.

Starting in block 804, the application may launch an agentless security SDK, for example via a single point of entry. As described above, the single point of entry may be a main procedure call, or it may be invoked simply by including the agentless security SDK with the project at build time, optionally with the appropriate priority so that system calls can be overridden or overloaded.

In block 808, the agentless security SDK begins monitoring the application. Monitoring continues so long as the application continues to operate.

In block 816, some signal is sent to terminate the application. The termination of the application in block 816 also signals termination of the monitoring services by agentless security SDK.

In block 820, as necessary, the agentless security SDK may perform cleanup or garbage collection or other services.

In block 890, the method is done.

Figure 9:
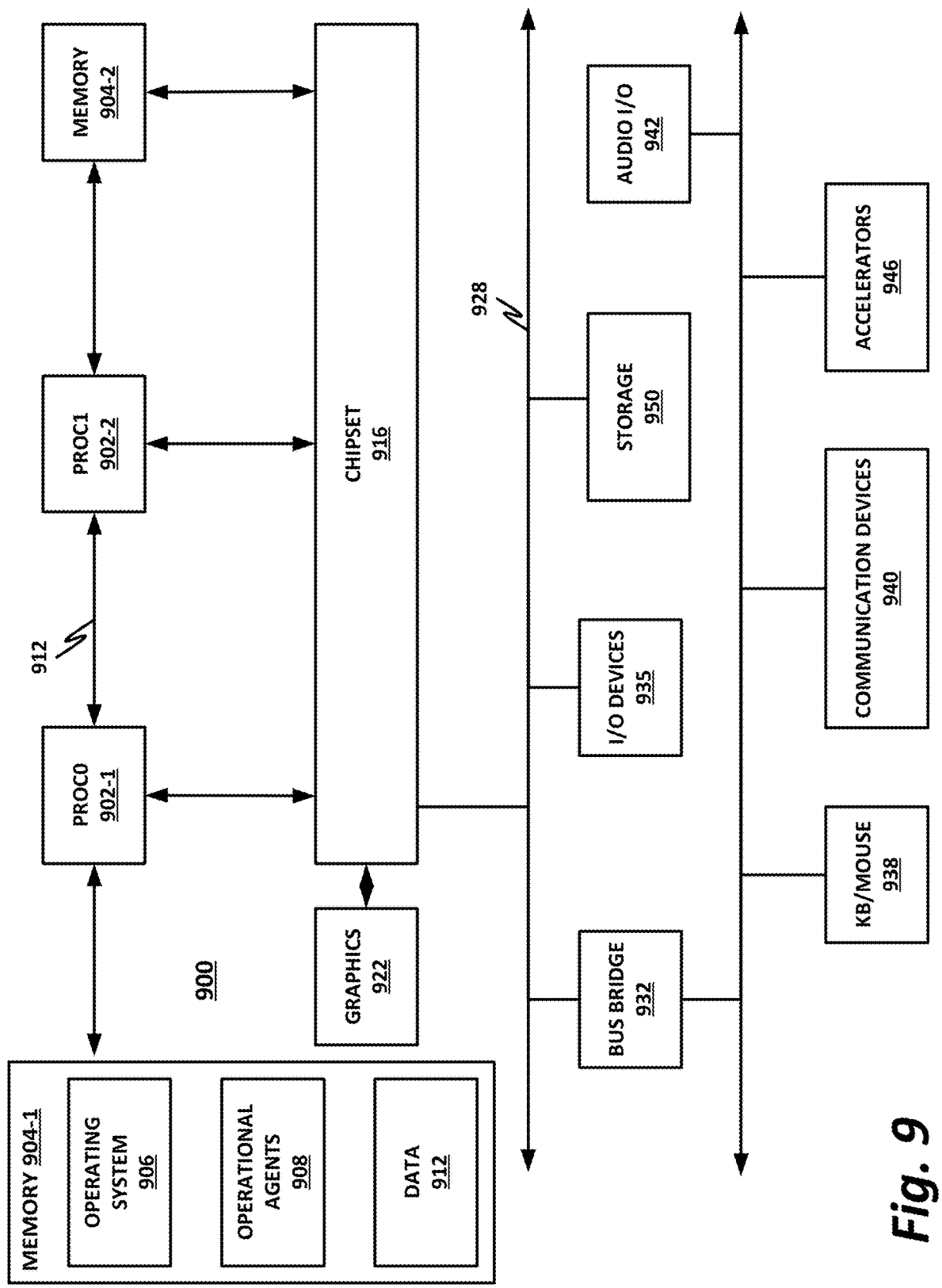
FIG. 9 is a block diagram of selected elements of a hardware platform.

FIG. 9 is a block diagram of a hardware platform 900. Embodiments of hardware platform 900 may be configured or adapted to provide agentless security, as disclosed in the present specification.

Although a particular configuration is illustrated here, there are many different configurations of hardware platforms, and this embodiment is intended to represent the class of hardware platforms that can provide a computing device. Furthermore, the designation of this embodiment as a "hardware platform" is not intended to require that all embodiments provide all elements in hardware. Some of the elements disclosed herein may be provided, in various embodiments, as hardware, software, firmware, microcode, microcode instructions, hardware instructions, hardware or software accelerators, or similar. Furthermore, in some embodiments, entire computing devices or platforms may be virtualized, on a single device, or in a data center where virtualization may span one or a plurality of devices. For example, in a "rackscale architecture" design, disaggregated computing resources may be virtualized into a single instance of a virtual device. In that case, all of the disaggregated resources that are used to build the virtual device may be considered part of hardware platform 900, even though they may be scattered across a data center, or even located in different data centers.

Hardware platform 900 is configured to provide a computing device. In various embodiments, a "computing device" may be or comprise, by way of nonlimiting example, a computer, workstation, server, mainframe, virtual machine (whether emulated or on a "bare metal" hypervisor), network appliance, container, IoT device, high performance computing (HPC) environment, a data center, a communications service provider infrastructure (e.g., one or more portions of an Evolved Packet Core), an in-memory computing environment, a computing system of a vehicle (e.g., an automobile or airplane), an industrial control system, embedded computer, embedded controller, embedded sensor, personal digital assistant, laptop computer, cellular telephone, internet protocol telephone, smart phone, tablet computer, convertible tablet computer, computing appliance, receiver, wearable computer, handheld calculator, or any other electronic, microelectronic, or microelectromechanical device for processing and communicating data. At least some of the methods and systems disclosed in this specification may be embodied by or carried out on a computing device.

In the illustrated example, hardware platform 900 is arranged in a point-to-point (PtP) configuration. This PtP configuration is popular for personal computer (PC) and server-type devices, although it is not so limited, and any other bus type may be used.

Hardware platform 900 is an example of a platform that may be used to implement embodiments of the teachings of this specification. For example, instructions could be stored in storage 950. Instructions could also be transmitted to the hardware platform in an ethereal form, such as via network interface 948, or retrieved from another source via any suitable interconnect. Once received (from any source), the instructions may be loaded into memory 904, and may then be executed by one or more processor 902 to provide elements such as an operating system 906, operational agents 908, or data 912.

Figure 11:
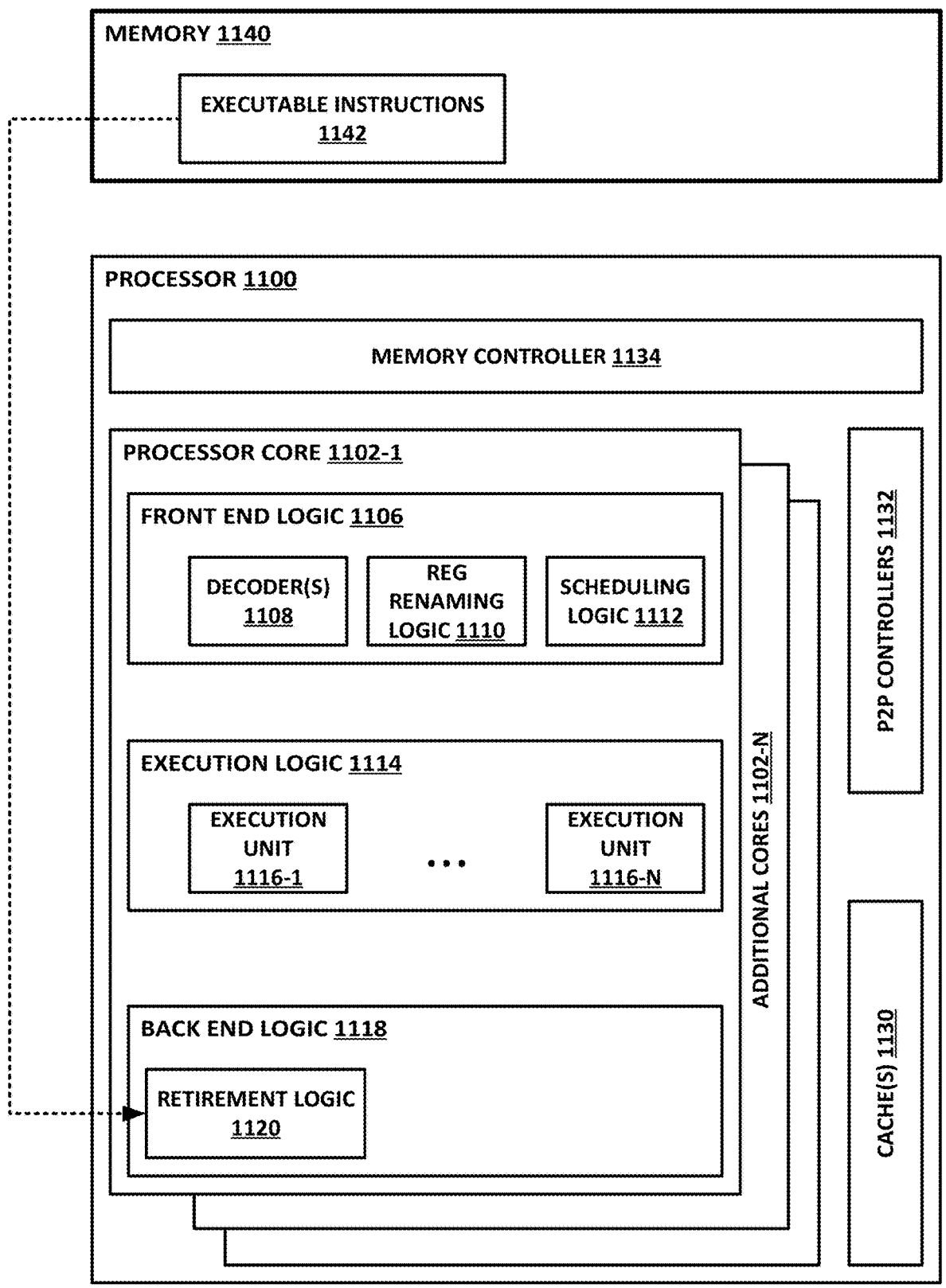
FIG. 11 is a block diagram of selected elements of a processor.

Hardware platform 900 may include several processors 902. For simplicity and clarity, only processors PROC0 902-1 and PROC1 902-2 are shown. Additional processors (such as 2, 4, 8, 16, 24, 32, 64, or 128 processors) may be provided as necessary, while in other embodiments, only one processor may be provided. Details of processors 902 are not illustrated in this FIGURE, but one embodiment is illustrated in FIG. 11. Processors may have any number of cores, such as 1, 2, 4, 8, 16, 24, 32, 64, or 128 cores.

Processors 902 may be any type of processor and may communicatively couple to chipset 916 via, for example, PtP interfaces. Chipset 916 may also exchange data with other elements, such as a high performance graphics adapter 922. In alternative embodiments, any or all of the PtP links illustrated in FIG. 9 could be implemented as any type of bus, or other configuration rather than a PtP link. In various embodiments, chipset 916 may reside on the same die or package as a central processor unit (CPU) 1312 or on one or more different dies or packages. Each chipset may support any suitable number of CPUs 902. A chipset 916 (which may be a chipset, uncore, Northbridge, Southbridge, or other suitable logic and circuitry) may also include one or more controllers to couple other components to one or more CPUs.

Two memories, 904-1 and 904-2 are shown, connected to PROC0 902-1 and PROC1 902-2, respectively. As an example, each processor is shown connected to its memory in a direct memory access (DMA) configuration, though other memory architectures are possible, including ones in which memory 904 communicates with processor 910 via a bus. For example, some memories may be connected via a system bus, or in a data center, memory may be accessible in a remote DMA (RDMA) configuration.

Memory 904 may include any form of volatile or nonvolatile memory including, without limitation, magnetic media (e.g., one or more tape drives), optical media, flash, random access memory (RAM), double data rate RAM (DDR RAM) nonvolatile RAM (NVRAM), static RAM (SRAM), dynamic RAM (DRAM), persistent RAM (PRAM), data-centric (DC) persistent memory (e.g., Intel® Optane/3D-crosspoint), cache, Layer 1 (L1) or Layer 2 (L2) memory, on-chip memory, registers, virtual memory region, read-only memory (ROM), flash memory, removable media, tape drive, cloud storage, or any other suitable local or remote memory component or components. Memory 904 may be used for short, medium, and/or long-term storage. Memory 904 may store any suitable data or information utilized by platform logic. In some embodiments, memory 904 may also comprise storage for instructions that may be executed by the cores of CPUs 902 or other processing elements (e.g., logic resident on chipsets 916) to provide functionality.

In certain embodiments, memory 904 may comprise a relatively low-latency volatile main memory, while storage 950 may comprise a relatively higher-latency nonvolatile memory. However, memory 904 and storage 950 need not be physically separate devices, and in some examples may represent simply a logical separation of function (if there is any separation at all). It should also be noted that although DMA is disclosed by way of nonlimiting example, DMA is not the only protocol consistent with this specification, and that other memory architectures are available.

Certain computing devices provide main memory 904 and storage 950, for example, in a single physical memory device, and in other cases, memory 904 and/or storage 950 are functionally distributed across many physical devices. In the case of virtual machines or hypervisors, all or part of a function may be provided in the form of software or firmware running over a virtualization layer to provide the logical function, and resources such as memory, storage, and accelerators may be disaggregated (i.e., located in different physical locations across a data center).

In other examples, a device such as a network interface may provide only the minimum hardware interfaces necessary to perform its logical operation, and may rely on a software driver to provide additional necessary logic. Thus, each logical block disclosed herein is broadly intended to include one or more logic elements configured and operable for providing the disclosed logical operation of that block. As used throughout this specification, "logic elements" may include hardware, external hardware (digital, analog, or mixed-signal), software, reciprocating software, services, drivers, interfaces, components, modules, algorithms, sensors, components, firmware, hardware instructions, microcode, programmable logic, or objects that can coordinate to achieve a logical operation.

Graphics adapter 922 may be configured to provide a human-readable visual output, such as a command-line interface (CLI) or graphical desktop such as Microsoft Windows, Apple OSX desktop, or a Unix/Linux X Window System-based desktop. Graphics adapter 922 may provide output in any suitable format, such as a coaxial output, composite video, component video, video graphics array (VGA), or digital outputs such as digital visual interface (DVI), FPDLink, DisplayPort, or high definition multimedia interface (HDMI), by way of nonlimiting example. In some examples, graphics adapter 922 may include a hardware graphics card, which may have its own memory and its own graphics processing unit (GPU).

Chipset 916 may be in communication with a bus 928 via an interface circuit. Bus 928 may have one or more devices that communicate over it, such as a bus bridge 932, I/O devices 935, network interface 948, accelerators 946, communication devices 940, and a keyboard and/or mouse 938, by way of nonlimiting example. In general terms, the elements of hardware platform 900 may be coupled together in any suitable manner. For example, a bus may couple any of the components together. A bus may include any known interconnect, such as a multi-drop bus, a mesh interconnect, a fabric, a ring interconnect, a round-robin protocol, a point-to-point interconnect, a serial interconnect, a parallel bus, a coherent (e.g., cache coherent) bus, a layered protocol architecture, a differential bus, or a Gunning transceiver logic (GTL) bus, by way of illustrative and nonlimiting example.

Communication devices 940 can broadly include any communication not covered by network interface 948 and the various I/O devices described herein. This may include, for example, various universal serial bus (USB), FireWire, Lightning, or other serial or parallel devices that provide communications.

I/O Devices 935 may be configured to interface with any auxiliary device that connects to hardware platform 900 but that is not necessarily a part of the core architecture of hardware platform 900. A peripheral may be operable to provide extended functionality to hardware platform 900, and may or may not be wholly dependent on hardware platform 900. In some cases, a peripheral may be a computing device in its own right. Peripherals may include input and output devices such as displays, terminals, printers, keyboards, mice, modems, data ports (e.g., serial, parallel, USB, Firewire, or similar), network controllers, optical media, external storage, sensors, transducers, actuators, controllers, data acquisition buses, cameras, microphones, speakers, or external storage, by way of nonlimiting example.

In one example, audio I/O 942 may provide an interface for audible sounds, and may include in some examples a hardware sound card. Sound output may be provided in analog (such as a 3.5 mm stereo jack), component ("RCA") stereo, or in a digital audio format such as S/PDIF, AES3, AES47, HDMI, USB, Bluetooth, or Wi-Fi audio, by way of nonlimiting example. Audio input may also be provided via similar interfaces, in an analog or digital form.

Bus bridge 932 may be in communication with other devices such as a keyboard/mouse 938 (or other input devices such as a touch screen, trackball, etc.), communication devices 940 (such as modems, network interface devices, peripheral interfaces such as PCI or PCIe, or other types of communication devices that may communicate through a network), audio I/O devices 942, a data storage device 944, and/or accelerators 946. In alternative embodiments, any portions of the bus architectures could be implemented with one or more PtP links.

Operating system 906 may be, for example, Microsoft Windows, Linux, UNIX, Mac OS X, iOS, MS-DOS, or an embedded or real-time operating system (including embedded or real-time flavors of the foregoing). In some embodiments, a hardware platform 900 may function as a host platform for one or more guest systems that invoke application (e.g., operational agents 908).

Operational agents 908 may include one or more computing engines that may include one or more non-transitory computer-readable mediums having stored thereon executable instructions operable to instruct a processor to provide operational functions. At an appropriate time, such as upon booting hardware platform 900 or upon a command from operating system 906 or a user or security administrator, processor 902 may retrieve a copy of the operational agent (or software portions thereof) from storage 950 and load it into memory 904. Processor 910 may then iteratively execute the instructions of operational agents 908 to provide the desired methods or functions.

As used throughout this specification, an "engine" includes any combination of one or more logic elements, of similar or dissimilar species, operable for and configured to perform one or more methods provided by the engine. In some cases, the engine may be or include a special integrated circuit designed to carry out a method or a part thereof, a field-programmable gate array (FPGA) programmed to provide a function, a special hardware or microcode instruction, other programmable logic, and/or software instructions operable to instruct a processor to perform the method. In some cases, the engine may run as a "daemon" process, background process, terminate-and-stay-resident program, a service, system extension, control panel, bootup procedure, basic in/output system (BIOS) subroutine, or any similar program that operates with or without direct user interaction. In certain embodiments, some engines may run with elevated privileges in a "driver space" associated with ring 0, 1, or 2 in a protection ring architecture. The engine may also include other hardware, software, and/or data, including configuration files, registry entries, application programming interfaces (APIs), and interactive or user-mode software by way of nonlimiting example.

Where elements of an engine are embodied in software, computer program instructions may be implemented in programming languages, such as an object code, an assembly language, or a high-level language such as OpenCL, FORTRAN, C, C++, JAVA, or HTML. These may be used with any compatible operating systems or operating environments. Hardware elements may be designed manually, or with a hardware description language such as Spice, Verilog, and VHDL. The source code may define and use various data structures and communication messages. The source code may be in a computer executable form (e.g., via an interpreter), or the source code may be converted (e.g., via a translator, assembler, or compiler) into a computer executable form, or converted to an intermediate form such as byte code. Where appropriate, any of the foregoing may be used to build or describe appropriate discrete or integrated circuits, whether sequential, combinatorial, state machines, or otherwise.

Network interface 948 may be provided to communicatively couple hardware platform 900 to a wired or wireless network or fabric. A "network," as used throughout this specification, may include any communicative platform operable to exchange data or information within or between computing devices, including, by way of nonlimiting example, a local network, a switching fabric, an ad-hoc local network, Ethernet (e.g., as defined by the IEEE 802.3 standard), Fibre Channel, InfiniBand, Wi-Fi, or other suitable standard. Intel® Omni-Path™ Architecture (OPA), TrueScale™, Ultra Path Interconnect (UPI) (formerly called QPI or KTI), FibreChannel, Ethernet, FibreChannel over Ethernet (FCoE), InfiniBand, PCI, PCIe, fiber optics, millimeter wave guide, an internet architecture, a packet data network (PDN) offering a communications interface or exchange between any two nodes in a system, a local area network (LAN), metropolitan area network (MAN), wide area network (WAN), wireless local area network (WLAN), VPN, intranet, plain old telephone system (POTS), or any other appropriate architecture or system that facilitates communications in a network or telephonic environment, either with or without human interaction or intervention. Network interface 948 may include one or more physical ports that may couple to a cable (e.g., an Ethernet cable, other cable, or waveguide).

In some cases, some or all of the components of hardware platform 900 may be virtualized, in particular the processor (s) and memory. For example, a virtualized environment may run on OS 906, or OS 906 could be replaced with a hypervisor or virtual machine manager. In this configuration, a virtual machine running on hardware platform 900 may virtualize workloads. A virtual machine in this configuration may perform essentially all of the functions of a physical hardware platform.

In a general sense, any suitably-configured processor can execute any type of instructions associated with the data to achieve the operations illustrated in this specification. Any of the processors or cores disclosed herein could transform an element or an article (for example, data) from one state or thing to another state or thing. In another example, some activities outlined herein may be implemented with fixed logic or programmable logic (for example, software and/or computer instructions executed by a processor).

Various components of the system depicted in FIG. 9 may be combined in a system-on-a-chip (SoC) architecture or in any other suitable configuration. For example, embodiments disclosed herein can be incorporated into systems including mobile devices such as smart cellular telephones, tablet computers, personal digital assistants, portable gaming devices, and similar. These mobile devices may be provided with SoC architectures in at least some embodiments. An example of such an embodiment is provided in FIG. 10. Such an SoC (and any other hardware platform disclosed herein) may include analog, digital, and/or mixed-signal, radio frequency (RF), or similar processing elements. Other embodiments may include a multichip module (MCM), with a plurality of chips located within a single electronic package and configured to interact closely with each other through the electronic package. In various other embodiments, the computing functionalities disclosed herein may be implemented in one or more silicon cores in application-specific integrated circuits (ASICs), FPGAs, and other semiconductor chips.

Figure 10:
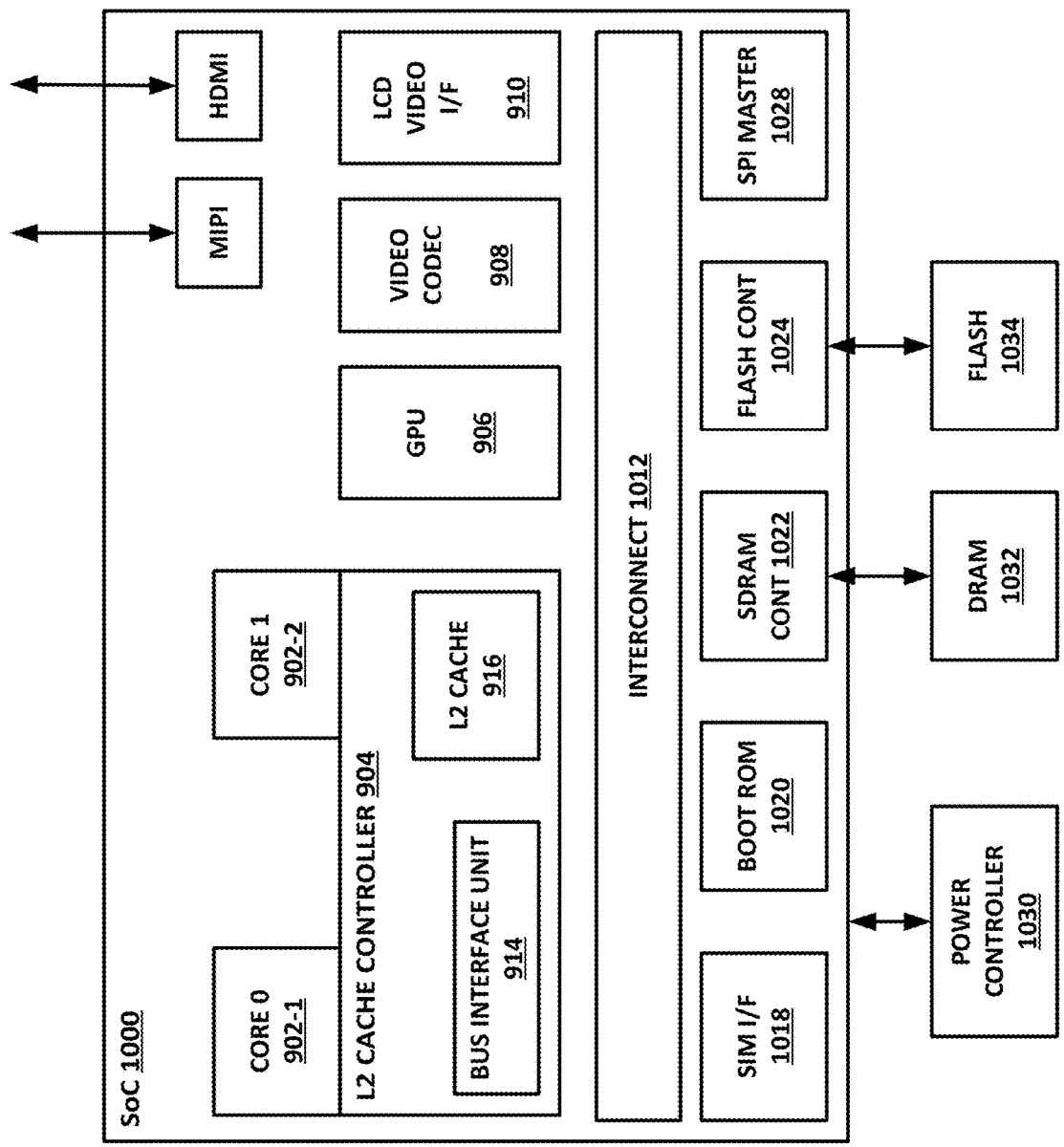
FIG. 10 is a block diagram of selected elements of a system-on-a-chip (SoC).

FIG. 10 is a block illustrating selected elements of an example SoC 1000. Embodiments of SoC 1000 may be configured or adapted to provide agentless security, as disclosed in the present specification.

At least some of the teachings of the present specification may be embodied on an SoC 1000, or may be paired with an SoC 1000. SoC 1000 may include, or may be paired with, an advanced reduced instruction set computer machine (ARM) component. For example, SoC 1000 may include or be paired with any ARM core, such as A-9, A-15, or similar. This architecture represents a hardware platform that may be useful in devices such as tablets and smartphones, by way of illustrative example, including Android phones or tablets, iPhone (of any version), iPad, Google Nexus, Microsoft Surface. SoC 1000 could also be integrated into, for example, a PC, server, video processing components, laptop computer, notebook computer, netbook, or touch-enabled device.

As with hardware platform 900 above, SoC 1000 may include multiple cores 1002a and 1002b. In this illustrative example, SoC 1000 also includes an L2 cache control 1004, a GPU 1006, a video codec 1008, a liquid crystal display (LCD) I/F 1010 and an interconnect 1012. L2 cache control 1004 can include a bus interface unit 1014, a L2 cache 1016. Liquid crystal display (LCD) I/F 1010 may be associated with mobile industry processor interface (MIPI)/HDMI links that couple to an LCD.

SoC 1000 may also include a subscriber identity module (SIM) I/F 1018, a boot ROM 1020, a synchronous dynamic random-access memory (SDRAM) controller 1022, a flash controller 1024, a serial peripheral interface (SPI) master 1028, a suitable power control 1030, a dynamic RAM (DRAM) 1032, and flash 1034. In addition, one or more embodiments include one or more communication capabilities, interfaces, and features such as instances of Bluetooth™ 1036, a 3G modem 1038, a global positioning system (GPS) 1040, and an 802.11 Wi-Fi 1042.

Designers of integrated circuits such as SoC 1000 (or other integrated circuits) may use intellectual property (IP) blocks to simplify system design. An IP block is a modular, self-contained hardware block that can be easily integrated into the design. Because the IP block is modular and self-contained, the integrated circuit (IC) designer need only "drop in" the IP block to use the functionality of the IP block. The system designer can then make the appropriate connections to inputs and outputs.

IP blocks are often "black boxes." In other words, the system integrator using the IP block may not know, and need not know, the specific implementation details of the IP block. Indeed, IP blocks may be provided as proprietary third-party units, with no insight into the design of the IP block by the system integrator.

For example, a system integrator designing an SoC for a smart phone may use IP blocks in addition to the processor core, such as a memory controller, a nonvolatile memory (NVM) controller, Wi-Fi, Bluetooth, GPS, a fourth or fifth-generation network (4G or 5G), an audio processor, a video processor, an image processor, a graphics engine, a GPU engine, a security controller, and many other IP blocks. In many cases, each of these IP blocks has its own embedded microcontroller.

FIG. 11 is a block diagram illustrating selected elements of a processor 1100. Embodiments of processor 1100 may be configured or adapted to provide agentless security, as disclosed in the present specification.

In various examples, and throughout this specification and the appended claims, a "processor" may include any combination of logic elements operable to execute instructions, whether loaded from memory, or implemented directly in hardware, including, by way of nonlimiting example, a microprocessor, microcontroller, CPU, advanced RISC (reduced instruction set computing) machine (ARM), digital signal processor (DSP), FPGA, GPU, programmable logic array, ASIC, or virtual machine processor. In certain architectures, a multi-core processor may be provided, having for example, 2, 4, 8, 12, 16, 24, 32, 64, or 128 cores. In some embodiments, one or more co-processors or accelerators (hardware or software) may also be provided for specialized or support functions. In general, processor 1100 may include any number of processing elements, which may be symmetrical or asymmetrical.

Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core may refer to logic located on an integrated circuit capable of maintaining an independent architectural state, wherein each independently maintained architectural state is associated with at least some dedicated execution resources. A hardware thread may refer to any logic located on an integrated circuit capable of maintaining an independent architectural state, wherein the independently maintained architectural states share access to execution resources. A physical CPU may include any suitable number of cores. In various embodiments, cores may include one or more out-of-order processor cores or one or more in-order processor cores. However, cores may be individually selected from any type of core, such as a native core, a software managed core, a core adapted to execute a native instruction set architecture (ISA), a core adapted to execute a translated ISA, a co-designed core, or other known core. In a heterogeneous core environment (i.e. asymmetric cores), some form of translation, such as binary translation, may be utilized to schedule or execute code on one or both cores.

Processor 1100 includes one or more processor cores 1102, including core 1102-1-1102-N. Cores 1102 may be, as appropriate, single-thread cores or multi-thread cores. In multithreaded cores, more than one hardware thread may be provided at a time, and the core may therefore provide more than one logical core per physical core. The cores may be configured to execute instruction code. Each processor 1100 may include at least one shared cache 1130, which may be treated logically as part of memory 1140. Caches 1130 may be filled according to known caching techniques, and may store instructions and/or data that may be used by one or more components of processor 1100.

Processor 1100 may include an integrated memory controller (MC) 1134, to communicate with memory 1140. Memory controller 1134 may include logic and circuitry to interface with memory 1140, and may also include a cache controller to handle filling and evicting instructions and data to and from cache 1130.

By way of example, each core 1102 may include front-end logic 1106, execution logic 1114, and backend logic 1118.

In the illustrated embodiment, front-end logic 1106 includes an instruction decoder or decoders 1108, register renaming logic 1110, and scheduling logic 1112. Decoder 1108 may decode instructions received. Register renaming logic 1110 may provide register renaming, for example to facilitate pipelining. Scheduling logic 1112 may schedule instruction execution, and may provide out-of-order (OOO) execution. Front-end logic 1106 may fetch incoming instructions, perform various processing (e.g., caching, decoding, branch predicting, etc.), and pass instructions to execution logic 1114.

Execution logic 1114 includes one or more execution units 1116-1-1116-N. Execution units 1116 may include hardware instructions and microcode to carry out the provided instructions.

Backend logic 1118 includes retirement logic 1120. Core 1102 may provide for speculative execution of instructions, branch prediction, and similar. Retirement logic 1120 may be configured to determine which predicted instructions were actually needed by the program flow.

Processor 1100 may also include a PtP controller 1132, which enables connection to an uncore, chipset, Northbridge, Southbridge, or bus, by way of example.

Figure 12:
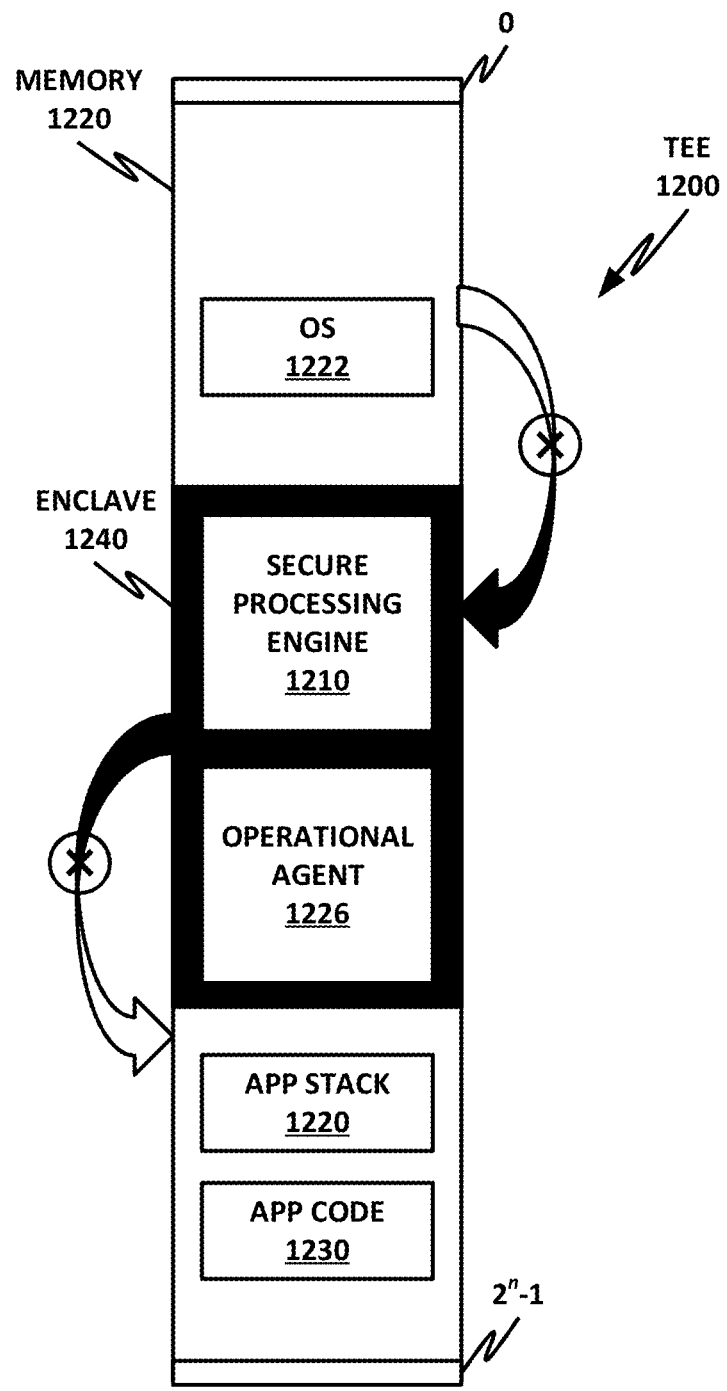
FIG. 12 is a block diagram of selected elements of a trusted execution environment (TEE).

FIG. 12 is a block diagram of a trusted execution environment (TEE) 1200. Embodiments of TEE 1200 may be configured or adapted to provide agentless security, as disclosed in the present specification.

In the example of FIG. 12, memory 1220 is addressable by n-bits, ranging in address from 0 to $2^n-1$ (note, however, that in many cases, the size of the address space may far exceed the actual memory available). Within memory 1220 is an OS 1222, enclave 1240, application stack 1220, and application code 1230.

In this example, enclave 1240 is a specially-designated portion of memory 1220 that cannot be entered into or exited from except via special instructions, such as Intel® Software Guard Extensions (SGX™) or similar. Enclave 1240 is provided as an example of a secure environment which, in conjunction with a secure processing engine 1210, forms a TEE 1200 on a hardware platform such as platform 900 of FIG. 9. A TEE 1200 is a combination of hardware, software, and/or memory allocation that provides the ability to securely execute instructions without interference from outside processes, in a verifiable way.

By way of example, TEE 1200 may include memory enclave 1240 or some other protected memory area, and a secure processing engine 1210, which includes hardware, software, and instructions for accessing and operating on enclave 1240. Nonlimiting examples of solutions that either are or that can provide a TEE include Intel® SGX™, ARM TrustZone, AMD Platform Security Processor, Kinibi, securiTEE, OP-TEE, TLK, T6, Open TEE, SierraTEE, CSE, VT-x, MemCore, Canary Island, Docker, and Smack. Thus, it should be noted that in an example, secure processing engine 1210 may be a user-mode application that operates via trusted execution framework 924 within enclave 1240. TEE 1200 may also conceptually include processor instructions that secure processing engine 1210 and trusted execution framework 924 require to operate within enclave 1240.

Secure processing engine 1210 and trusted execution framework 924 may together form a trusted computing base (TCB), which is a set of programs or computational units that are trusted to be secure. Conceptually, it may be advantageous to keep TCB relatively small so that there are fewer attack vectors for malware objects or for negligent software. Thus, for example, operating system 1222 may be excluded from TCB, in addition to the regular application stack 1220 and application code 1230.

In certain systems, computing devices equipped with Intel® SGX™ or equivalent instructions may be capable of providing an enclave 1240. It should be noted, however, that many other examples of TEEs are available, and TEE 1200 is provided only as one example thereof. Other secure environments may include, by way of nonlimiting example, a virtual machine, sandbox, testbed, test machine, or other similar device or method for providing a TEE 1200.

In an example, enclave 1240 provides a protected memory area that cannot be accessed or manipulated by ordinary computer instructions. Enclave 1240 is described with particular reference to an Intel® SGX™ enclave by way of example, but it is intended that enclave 1240 encompass any secure processing area with suitable properties, regardless of whether it is called an "enclave."

One feature of an enclave is that once an enclave region 1240 of memory 1220 is defined, as illustrated, a program pointer cannot enter or exit enclave 1240 without the use of special enclave instructions or directives, such as those provided by Intel® SGX™ architecture. For example, SGX™ processors provide the ENCLU[EENTER], ENCLU[ERESUME], and ENCLU[EEXIT]. These are the only instructions that may legitimately enter into or exit from enclave 1240.

Thus, once enclave 1240 is defined in memory 904, a program executing within enclave 1240 may be safely verified to not operate outside of its bounds. This security feature means that secure processing engine 1210 is verifiably local to enclave 1240. Thus, when an untrusted packet provides its content to be rendered with trusted execution framework 924 of enclave 1240, the result of the rendering is verified as secure.

Enclave 1240 may also digitally sign its output, which provides a verifiable means of ensuring that content has not been tampered with or modified since being rendered by secure processing engine 1210. A digital signature provided by enclave 1240 is unique to enclave 1240 and is unique to the hardware of the device hosting enclave 1240.

Figure 13:
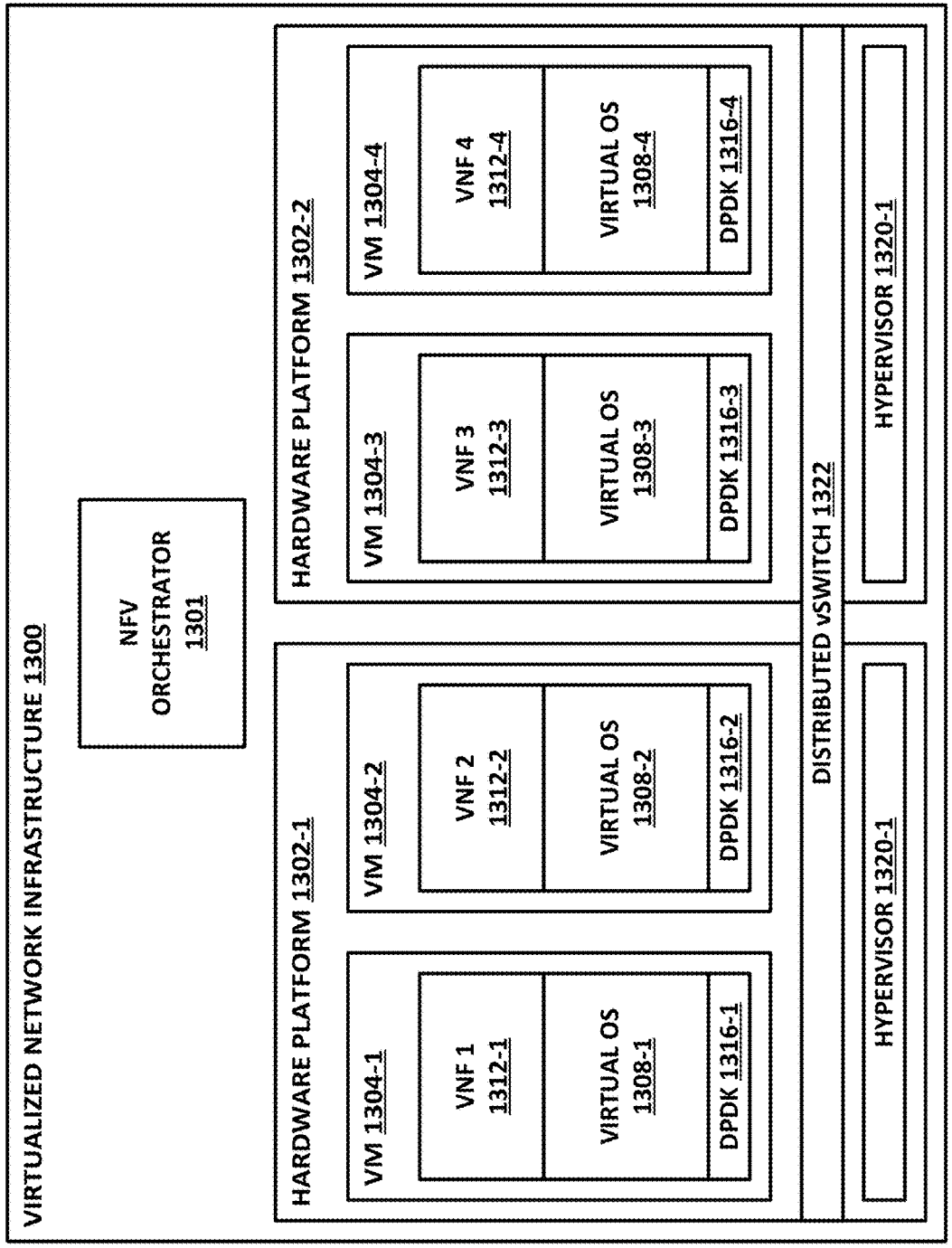
FIG. 13 is a block diagram of selected elements of a network function virtualization (NFV) infrastructure.

FIG. 13 is a block diagram of a network function virtualization (NFV) infrastructure 1300. Embodiments of NFV infrastructure 1300 may be configured or adapted to provide agentless security, as disclosed in the present specification.

NFV is an aspect of network virtualization that is generally considered distinct from, but that can still interoperate with, SDN. For example, virtual network functions (VNFs) may operate within the data plane of an SDN deployment. NFV was originally envisioned as a method for providing reduced capital expenditure (Capex) and operating expenses (Opex) for telecommunication services. One feature of NFV is replacing proprietary, special-purpose hardware appliances with virtual appliances running on commercial off-the-shelf (COTS) hardware within a virtualized environment. In addition to Capex and Opex savings, NFV provides a more agile and adaptable network.

As network loads change, VNFs can be provisioned ("spun up") or removed ("spun down") to meet network demands. For example, in times of high load, more load balancing VNFs may be spun up to distribute traffic to more workload servers (which may themselves be virtual machines). In times when more suspicious traffic is experienced, additional firewalls or deep packet inspection (DPI) appliances may be needed.

Because NFV started out as a telecommunications feature, many NFV instances are focused on telecommunications. However, NFV is not limited to telecommunication services. In a broad sense, NFV includes one or more VNFs running within a network function virtualization infrastructure (NFVI), such as NFVI 400. Often, the VNFs are inline service functions that are separate from workload servers or other nodes. These VNFs can be chained together into a service chain, which may be defined by a virtual subnetwork, and which may include a serial string of network services that provide behind-the-scenes work, such as security, logging, billing, and similar.

In the example of FIG. 13, an NFV orchestrator 1301 manages a number of the VNFs 1312 running on an NFVI 1300. NFV requires nontrivial resource management, such as allocating a very large pool of compute resources among appropriate numbers of instances of each VNF, managing connections between VNFs, determining how many instances of each VNF to allocate, and managing memory, storage, and network connections. This may require complex software management, thus making NFV orchestrator 1301 a valuable system resource. Note that NFV orchestrator 1301 may provide a browser-based or graphical configuration interface, and in some embodiments may be integrated with SDN orchestration functions.

Note that NFV orchestrator 1301 itself may be virtualized (rather than a special-purpose hardware appliance). NFV orchestrator 1301 may be integrated within an existing SDN system, wherein an operations support system (OSS) manages the SDN. This may interact with cloud resource management systems (e.g., OpenStack) to provide NFV orchestration.

An NFVI 1300 may include the hardware, software, and other infrastructure to enable VNFs to run. This may include a hardware platform 1302 on which one or more VMs 1304 may run. For example, hardware platform 1302-1 in this example runs VMs 1304-1 and 1304-2. Hardware platform 1302-2 runs VMs 1304-3 and 1304-4. Each hardware platform may include a hypervisor 1320, virtual machine manager (VMM), or similar function, which may include and run on a native (bare metal) operating system, which may be minimal so as to consume very few resources.

Hardware platforms 1302 may be or comprise a rack or several racks of blade or slot servers (including, e.g., processors, memory, and storage), one or more data centers, other hardware resources distributed across one or more geographic locations, hardware switches, or network interfaces. An NFVI 1300 may also include the software architecture that enables hypervisors to run and be managed by NFV orchestrator 1301.

Running on NFVI 1300 are a number of VMs 1304, each of which in this example is a VNF providing a virtual service appliance. Each VM 1304 in this example includes an instance of the Data Plane Development Kit (DPDK), a virtual operating system 1308, and an application providing the VNF 1312.

Virtualized network functions could include, as nonlimiting and illustrative examples, firewalls, intrusion detection systems, load balancers, routers, session border controllers, DPI services, network address translation (NAT) modules, or call security association.

The illustration of FIG. 13 shows that a number of VNFs 1304 have been provisioned and exist within NFVI 1300. This FIGURE does not necessarily illustrate any relationship between the VNFs and the larger network, or the packet flows that NFVI 1300 may employ.

The illustrated DPDK instances 1316 provide a set of highly-optimized libraries for communicating across a virtual switch (vSwitch) 1322. Like VMs 1304, vSwitch 1322 is provisioned and allocated by a hypervisor 1320. The hypervisor uses a network interface to connect the hardware platform to the data center fabric (e.g., an HFI). This HFI may be shared by all VMs 1304 running on a hardware platform 1302. Thus, a vSwitch may be allocated to switch traffic between VMs 1304.

The vSwitch may be a pure software vSwitch (e.g., a shared memory vSwitch), which may be optimized so that data are not moved between memory locations, but rather, the data may stay in one place, and pointers may be passed between VMs 1304 to simulate data moving between ingress and egress ports of the vSwitch. The vSwitch may also include a hardware driver (e.g., a hardware network interface IP block that switches traffic, but that connects to virtual ports rather than physical ports). In this illustration, a distributed vSwitch 1322 is illustrated, wherein vSwitch 1322 is shared between two or more physical hardware platforms 1302.

The foregoing outlines features of several embodiments so that those skilled in the art may better understand various aspects of the present disclosure. The embodiments disclosed can readily be used as the basis for designing or modifying other processes and structures to carry out the teachings of the present specification. Any equivalent constructions to those disclosed do not depart from the spirit and scope of the present disclosure. Design considerations may results in substitute arrangements, design choices, device possibilities, hardware configurations, software implementations, and equipment options.

In certain embodiments, some of the components illustrated herein may be omitted or consolidated. In a general sense, the arrangements depicted in the FIGURES may be more logical in their representations, whereas a physical architecture may include various permutations, combinations, and/or hybrids of these elements. With the numerous examples provided herein, interaction may be described in terms of two, three, four, or more electrical components. These descriptions are provided for purposes of clarity and example only. Any of the illustrated components, modules, and elements of the FIGURES may be combined in various configurations, all of which fall within the scope of this specification.

In certain cases, it may be easier to describe one or more functionalities by disclosing only selected element. Such elements are selected to illustrate specific information to facilitate the description. The inclusion of an element in the FIGURES is not intended to imply that the element must appear in the invention, as claimed, and the exclusion of certain elements from the FIGURES is not intended to imply that the element is to be excluded from the invention as claimed.

Similarly, any methods or flows illustrated herein are provided by way of illustration only. Inclusion or exclusion of operations in such methods or flows should be understood the same as inclusion or exclusion of other elements as described in this paragraph. Where operations are illustrated in a particular order, the order is a nonlimiting example only. Unless expressly specified, the order of operations may be altered to suit a particular embodiment. Other changes, substitutions, variations, alterations, and modifications will be apparent to those skilled in the art. All such changes, substitutions, variations, alterations, and modifications fall within the scope of this specification.

In order to aid the United States Patent and Trademark Office (USPTO) and, any readers of any patent or publication flowing from this specification, the Applicant: (a) does not intend any of the appended claims to invoke paragraph (f) of 35 U.S.C. section 112, or its equivalent, as it exists on the date of the filing hereof unless the words "means for" or "steps for" are specifically used in the particular claims; and (b) does not intend, by any statement in the specification, to limit this disclosure in any way that is not otherwise expressly reflected in the appended claims, as originally presented or as amended.

EXAMPLE IMPLEMENTATIONS

There is disclosed in one example, a computing apparatus, comprising: a hardware platform comprising a processor and a memory; a closed operating system comprising instructions within the memory to sandbox userspace applications; and a sandboxed userspace application, comprising: instructions to provide a user interface and user application code; and an agentless security library within the sandboxed userspace application, the agentless security library comprising instructions to provide security or privacy services to the sandboxed userspace application with minimal direct interaction from the user interface and user application code.

There is further disclosed an example computing apparatus, wherein the agentless security library comprises a single point of entry for the sandboxed userspace application to invoke the agentless security library.

There is further disclosed an example computing apparatus, wherein the single point of entry comprises a single procedure invocation of the agentless security library.

There is further disclosed an example computing apparatus, wherein the single point of entry comprises a compile-time inclusion of a header file that automatically invokes the agentless security library, such as via macro definitions. In other case, a particular piece of code or instructions may be provided.

There is further disclosed an example computing apparatus, wherein the header file further comprises macro replacements or overloads of common userspace methods to communicate data.

There is further disclosed an example computing apparatus, wherein the sandboxed userspace application carries a certification that the sandboxed userspace application receives security or privacy services from the agentless security library.

There is further disclosed an example computing apparatus, wherein the agentless security library comprises instructions to write verification data to a log file.

There is further disclosed an example computing apparatus, wherein the agentless security library comprises instructions to communicate with a cloud server to provide verification.

There is further disclosed an example computing apparatus, wherein the agentless security library comprises instructions to certify that the sandboxed userspace application complies with legal or regulatory requirements for security or privacy.

There is further disclosed an example computing apparatus, wherein the agentless security library comprises instrumentation to intercept communication within the sandboxed userspace application, and outside of the sandboxed userspace application.

There is further disclosed an example computing apparatus, wherein the agentless security library comprises a detection engine to detect security flaws within the sandboxed userspace application.

There is further disclosed an example computing apparatus, wherein the agentless security library comprises a privacy engine to detect export of personally-identifying information (PII) outside of the sandboxed userspace application.

There is further disclosed an example computing apparatus, wherein the agentless security library comprises a network environment engine to detect an attack against a network environment of the sandboxed userspace application.

There is further disclosed an example computing apparatus, wherein the agentless security library comprises a best practices engine to enforce best security practices within the sandboxed userspace application.

There is further disclosed an example computing apparatus, wherein the agentless security library comprises an enforcement engine to enforce a usage or security policy within the sandboxed userspace application.

There is further disclosed an example computing apparatus, wherein the enforcement engine comprises instructions to provide parental controls.

There is further disclosed an example computing apparatus, wherein the agentless security library comprises a notification engine to provide notices to an end user and/or security administrator.

There is also disclosed an example of one or more tangible, non-transitory computer-readable media having stored thereon executable instructions to provide an agentless security software development kit (SDK) for inclusion with a sandboxed application on a closed operating system, the agentless security SDK comprising a single point of entry for the sandboxed application to invoke security or privacy services of the agentless security SDK.

There is further disclosed an example of one or more tangible, non-transitory computer-readable storage media, wherein the single point of entry comprises a single procedure invocation of the agentless security library.

There is further disclosed an example of one or more tangible, non-transitory computer-readable storage media, wherein the single point of entry comprises a compile-time inclusion of a header file that automatically invokes the agentless security library.

There is further disclosed an example of one or more tangible, non-transitory computer-readable storage media, wherein the header file further comprises macro replacements or overloads of common userspace methods to communicate data.

There is further disclosed an example of one or more tangible, non-transitory computer-readable storage media, wherein the agentless security SDK further comprises instructions to certify that the userspace application carries a certification that the userspace application receives security or privacy services from the agentless security SDK.

There is further disclosed an example of one or more tangible, non-transitory computer-readable storage media, wherein the agentless security SDK comprises instructions to write verification data to a log file.

There is further disclosed an example of one or more tangible, non-transitory computer-readable storage media, wherein the agentless security SDK comprises instructions to communicate with a cloud server to provide verification.

There is further disclosed an example of one or more tangible, non-transitory computer-readable storage media, wherein the agentless security SDK comprises instructions to certify that the sandboxed application complies with legal or regulatory requirements for security or privacy.

There is further disclosed an example of one or more tangible, non-transitory computer-readable storage media, wherein the agentless security SDK comprises instrumentation to intercept communication within the sandboxed application, and outside of the sandboxed application.

There is further disclosed an example of one or more tangible, non-transitory computer-readable storage media, wherein the agentless security SDK comprises a detection engine to detect security flaws within the sandboxed application.

There is further disclosed an example of one or more tangible, non-transitory computer-readable storage media, wherein the agentless security SDK comprises a privacy engine to detect export of personally-identifying information (PII) outside of the sandboxed application.

There is further disclosed an example of one or more tangible, non-transitory computer-readable storage media, wherein the agentless security SDK comprises a network environment engine to detect an attack against a network environment of the sandboxed application.

There is further disclosed an example of one or more tangible, non-transitory computer-readable storage media, wherein the agentless security SDK comprises a best practices engine to enforce best security practices within the sandboxed application.

There is further disclosed an example of one or more tangible, non-transitory computer-readable storage media, wherein the agentless security SDK comprises an enforcement engine to enforce a usage or security policy within the sandboxed application.

There is further disclosed an example of one or more tangible, non-transitory computer-readable storage media, wherein the enforcement engine comprises instructions to provide parental controls.

There is further disclosed an example of one or more tangible, non-transitory computer-readable storage media, wherein the agentless security SDK comprises a notification engine to provide notices to an end user and/or security administrator.

There is also disclosed an example method of developing a secured application for a closed operating system, comprising invoking, at build time, an agentless security software development kit (SDK) for inclusion with the secured application, wherein the invocation comprises minimal direct interaction between the agentless security SDK and the secured application.

There is further disclosed an example method, wherein invoking the agentless security SDK comprises invoking a utility that replaces common communication procedures with communication procedures that are hooked by the agentless security SDK.

There is further disclosed an example method, wherein invoking the agentless security SDK comprises invoking a single point of entry.

There is further disclosed an example method, wherein the single point of entry comprises invoking a single procedure that starts the agentless security SDK as a background process of the secured application only.

There is further disclosed an example method, wherein the single point of entry comprises including a header file that automatically invokes the agentless security library.

There is further disclosed an example method, wherein the header file further comprises macro replacements or overloads of common userspace methods to communicate data.

There is further disclosed an example method, wherein the agentless security SDK comprises instructions to certify that the userspace application carries a certification that the userspace application receives security or privacy services from the agentless security SDK.

There is further disclosed an example method, wherein the agentless security SDK comprises instructions to write verification data to a log file.

There is further disclosed an example method, wherein the agentless security SDK comprises instructions to communicate with a cloud server to provide verification.

There is further disclosed an example method, wherein the agentless security SDK comprises instructions to certify that the secured application complies with legal or regulatory requirements for security or privacy.

There is further disclosed an example method, wherein the agentless security SDK comprises instrumentation to intercept communication within the secured application, and outside of the secured application.

There is further disclosed an example method, wherein the agentless security SDK comprises a detection engine to detect security flaws within the secured application.

There is further disclosed an example method, wherein the agentless security SDK comprises a privacy engine to detect export of personally-identifying information (PII) outside of the secured application.

There is further disclosed an example method, wherein the agentless security SDK comprises a network environment engine to detect an attack against a network environment of the secured application.

There is further disclosed an example method, wherein the agentless security SDK comprises a best practices engine to enforce best security practices within the secured application.

There is further disclosed an example method, wherein the agentless security SDK comprises an enforcement engine to enforce a usage or security policy within the secured application.

There is further disclosed an example method, wherein the enforcement engine comprises instructions to provide parental controls.

There is further disclosed an example method, wherein the agentless security SDK comprises a notification engine to provide notices to an end user and/or security administrator.

There is also disclosed an example apparatus comprising means for performing the method of a number of the above examples.

There is further disclosed an example apparatus, wherein the means for performing the method comprise a processor and a memory.

There is further disclosed an example apparatus, wherein the memory comprises machine-readable instructions, that when executed cause the apparatus to perform the method of a number of the above examples.

There is further disclosed an example apparatus, wherein the apparatus is a computing system.

There is further disclosed an example of at least one computer-readable medium comprising instructions that, when executed, implement a method or realize an apparatus as illustrated in a number of the above examples.

What is claimed is:

1. A computing apparatus, comprising:
   a hardware platform comprising a processor and a memory;
   a closed operating system comprising instructions within the memory to sandbox userspace applications from one another, wherein sandboxing an application comprises assigning a memory space to the sandboxed application and restricting access to the memory space from other applications; and
   a sandboxed userspace application, comprising instructions to:
      provide a user interface and user application code; and
      provide an agentless security library within the sandboxed userspace application, the agentless security library comprising instructions to provide security or privacy services to the sandboxed userspace application with a single point of entry, comprising a single runtime or compile-time invocation of the agentless security library by the sandboxed userspace application.

2. The computing apparatus of claim 1, wherein the single point of entry comprises a single procedure invocation of the agentless security library.

3. The computing apparatus of claim 1, wherein the single point of entry comprises a compile-time inclusion of a header file that automatically invokes the agentless security library.

4. The computing apparatus of claim 3, wherein the header file further comprises macro replacements or overloads of common userspace methods to communicate data.

5. The computing apparatus of claim 1, wherein the sandboxed userspace application carries a certification that the sandboxed userspace application receives security or privacy services from the agentless security library.

6. The computing apparatus of claim 5, wherein the agentless security library comprises instructions to write verification data to a log file.

7. The computing apparatus of claim 5, wherein the agentless security library comprises instructions to communicate with a cloud server to provide verification.

8. The computing apparatus of claim 1, wherein the agentless security library comprises instructions to certify that the sandboxed userspace application complies with legal or regulatory requirements for security or privacy.

9. The computing apparatus of claim 1, wherein the agentless security library comprises instrumentation to intercept communication within the sandboxed userspace application, and outside of the sandboxed userspace application.

10. The computing apparatus of claim 1, wherein the agentless security library comprises a detection engine to detect security flaws within the sandboxed userspace application.

11. One or more tangible, non-transitory computer-readable media having stored thereon executable instructions to provide an agentless security software development kit (SDK) for inclusion with a sandboxed application on a closed operating system, the agentless security SDK comprising a single point of entry for the sandboxed application to invoke security or privacy services of the agentless security SDK via a single runtime or compile-time invocation of the agentless security SDK by the sandboxed application.

12. The one or more tangible, non-transitory computer-readable storage media of claim 11, wherein the agentless security SDK comprises a detection engine to detect security flaws within the sandboxed application.

13. The one or more tangible, non-transitory computer-readable storage media of claim 11, wherein the agentless security SDK comprises a privacy engine to detect export of personally-identifying information (PII) outside of the sandboxed application.

14. The one or more tangible, non-transitory computer-readable storage media of claim 11, wherein the agentless security SDK comprises a network environment engine to detect an attack against a network environment of the sandboxed application.

15. The one or more tangible, non-transitory computer-readable storage media of claim 11, wherein the agentless security SDK comprises a best practices engine to enforce best security practices within the sandboxed application.

16. The one or more tangible, non-transitory computer-readable storage media of claim 11, wherein the agentless security SDK comprises an enforcement engine to enforce a usage or security policy within the sandboxed application.

17. The one or more tangible, non-transitory computer-readable storage media of claim 16, wherein the enforcement engine comprises instructions to provide parental controls.

18. A method of developing a secured application for a closed operating system, comprising invoking, at build time, an agentless security software development kit (SDK) for inclusion with the secured application, wherein the invocation comprises a single compile-time invocation of the agentless security SDK within the secured application, wherein the secured application is sandboxed by a host operating system into a private memory space not accessible to other applications.

19. The method of 18, wherein invoking the agentless security SDK comprises invoking a utility that overloads common communication procedures with communication procedures that are hooked by the agentless security SDK.

* * * * *

UNITED STATES PATENT AND TRADEMARK OFFICE
CERTIFICATE OF CORRECTION

| | |
|---|---|
| PATENT NO. | : 11,308,204 B2 |
| APPLICATION NO. | : 16/549115 |
| DATED | : April 19, 2022 |
| INVENTOR(S) | : Lior Rudnik et al. |

It is certified that error appears in the above-identified patent and that said Letters Patent is hereby corrected as shown below:

In the Claims

In Column 33, Line 8, in Claim 19, delete "18" and insert -- claim 18 --, therefor.

Signed and Sealed this
Twenty-fourth Day of May, 2022

Katherine Kelly Vidal
*Director of the United States Patent and Trademark Office*